(12) United States Patent
Martin

(10) Patent No.: US 7,520,556 B2
(45) Date of Patent: Apr. 21, 2009

(54) RETRACTABLE VEHICLE ROOF SYSTEM WITH STORAGE AREA LID

(76) Inventor: Jay Martin, 771 St. Johns Ave., Highland Park, IL (US) 60035

( * ) Notice: Subject to any disclaimer, the term of this patent is extended or adjusted under 35 U.S.C. 154(b) by 23 days.

(21) Appl. No.: 11/761,104

(22) Filed: Jun. 11, 2007

(65) Prior Publication Data
US 2008/0197665 A1 Aug. 21, 2008

Related U.S. Application Data

(63) Continuation-in-part of application No. 11/184,342, filed on Jul. 19, 2005, now Pat. No. 7,229,122.

(51) Int. Cl.
*B60J 7/14* (2006.01)
(52) U.S. Cl. .............. 296/108; 296/107.07; 296/107.08
(58) Field of Classification Search ............ 296/107.08, 296/108, 146.14, 107.07
See application file for complete search history.

(56) References Cited

U.S. PATENT DOCUMENTS

| | | | |
|---|---|---|---|
| 2,768,024 A | 10/1956 | Spear, Jr. | |
| 2,768,025 A | 10/1956 | Spear, Jr. | |
| 2,841,441 A | 7/1958 | Evans | |
| 2,957,725 A | 10/1960 | Ford et al. | |
| 3,021,174 A | 2/1962 | Rund | |
| 4,634,171 A | 1/1987 | McKeag | |
| 5,078,447 A | 1/1992 | Klein et al. | |
| 5,360,254 A | 11/1994 | Sorimachi et al. | |
| 5,489,134 A | 2/1996 | Furuki et al. | |
| 5,551,743 A | 9/1996 | Klein et al. | |
| 5,769,483 A | 6/1998 | Danzl et al. | |
| 5,806,912 A | 9/1998 | Ramaciotti et al. | |
| 6,062,628 A | 5/2000 | Guillez | |
| 6,092,335 A | 7/2000 | Queveau et al. | |
| 6,145,915 A | 11/2000 | Queveau et al. | |
| 6,302,470 B1 | 10/2001 | Maass et al. | |
| 6,347,827 B1 | 2/2002 | Maass et al. | |
| 6,357,815 B1 | 3/2002 | Queveau et al. | |
| 6,361,097 B1 * | 3/2002 | Lechkun | 296/37.1 |
| 6,439,642 B2 | 8/2002 | MacFarland | |

(Continued)

OTHER PUBLICATIONS

Mercedes-Benz 2005 SL-Class [Brochure]. (2004). Mercedes-Benz USA, LL, Marketing Communications, 3 pages.

(Continued)

*Primary Examiner*—Dennis H Pedder
(74) *Attorney, Agent, or Firm*—Moore & Hansen, PLLP

(57) ABSTRACT

A retractable vehicle roof system for a vehicle having a rearward storage space includes a roof portion movable between a closed position and an open position. The roof portion is located above a body of the vehicle and proximate the rearward storage space when in the closed position. A lid is located above the rearward storage space when the roof portion is in the closed position. The lid is configured to descend into the storage space as the roof portion moves to the open position above the lid while substantially preserving a side profile of the vehicle and permitting storage space access. The roof portion is located above the lid when the roof portion is in the open position. A glide control arrangement is operatively connected to the lid and configured to direct motion of the lid when the roof portion moves between the open and closed positions.

17 Claims, 30 Drawing Sheets

U.S. PATENT DOCUMENTS

| | | |
|---|---|---|
| 6,454,342 B2 | 9/2002 | Heselhaus et al. |
| 6,497,447 B1 | 12/2002 | Willard |
| 6,540,280 B2 | 4/2003 | Tamura et al. |
| 6,578,898 B2 | 6/2003 | Rothe et al. |
| 6,585,307 B1 | 7/2003 | Queveau et al. |
| 6,595,572 B2 | 7/2003 | Schuler et al. |
| 6,666,495 B2 | 12/2003 | Nania |
| 6,679,539 B2 | 1/2004 | Guillez |
| 6,682,125 B2 | 1/2004 | Guillez |
| 6,682,149 B1 | 1/2004 | Guillez |
| 6,702,363 B2 | 3/2004 | Tohda et al. |
| 6,705,662 B2 | 3/2004 | Sande |
| 6,722,724 B1 | 4/2004 | MacFarland |
| 7,226,109 B2 * | 6/2007 | Martin .................. 296/107.08 |
| 7,354,095 B2 * | 4/2008 | Fleming et al. ........ 296/107.18 |
| 2004/0124660 A1 * | 7/2004 | Heller et al. ........... 296/107.01 |

OTHER PUBLICATIONS http://www.bodine-electric.com/Asp/ProductSeries.asp?Context=14&Name=42A%2DGB+Series+DC+Right+Angle+Hollow+Shaft+Gearmotor (3 pages).

http://www.bodine-electric.com/Asp/ProductSeries.asp?Context=13&Name=42A%2DE+and+42A%2DF+Series+Parallel+Shaft+DC+Gearmotor&Sort=0 (3 pages).

Antoine, S.A. Three Roadster Kings, Motor Trend, vol. 55, No. 7 (Jul. 2003), pp. 6-10.

Exhibit "A" Bodine-Electric Company [Brochure] (2005), 3 pages.

Exhibit "B" Bodine-Electric Company, 2003 Catalog S-15, 6 pages.

Exhibit "C" Daytona Sunset Orange Metallic, [Brochure], 4 pages.

* cited by examiner

RETRACTABLE VEHICLE ROOF SYSTEM WITH STORAGE AREA LID

RELATED APPLICATION

This application is a continuation-in-part of the copending application:

U.S. patent application Ser. No. 11/184,342, filed Jul. 19, 2005, entitled "Motor Assisted Movement of Vehicle Top with Storage Area Lid" by Jay R. Martin, which issues as U.S. Pat. No. 7,229,122 on Jun. 12, 2007.

TECHNICAL FIELD

The present disclosure relates generally to retractable vehicle roof systems. In particular, this application relates to a method and apparatus for retracting a rigid vehicle roof to an exterior storage position above the trunk while preserving the side profile of the vehicle and permitting trunk access.

BACKGROUND OF THE DISCLOSURE

In general, open-roof designs for individualized transportation have been utilized for many years as established by carriages and the first engine-driven vehicles. Open driving was and is part of the culture of automobile driving with continued interest for contemporary designs. In the case of convertibles, it is primarily folding roofs, which are constructed in such a manner as to be able to be retracted and stretched out again, with a structure of bars and an external skin which is correspondingly foldable. Such types of folding roofs have disadvantages, particularly for reason of restricted suitability during bad weather and winter and are, due to construction, adversely affected by unpleasant wind noises at high speeds.

For increased suitability during bad weather and winter, rigid convertible folding tops, so-called hard tops were designed to provide a detachable roof, with the same paintwork and finish as the body. However, early designs were extremely expensive and complex, lending to limited production offerings.

Because of tendencies within the culture of motor vehicles at the present time, convertibles are no longer purely used as leisure-time vehicles, such as a second or third household car. Instead, such vehicles serve as a primary vehicle, leading to significant design options for hard tops which can be retracted into the vehicle space behind the passenger compartment. The most common areas for storage include a space between the passenger compartment and the trunk or within the trunk itself, thereby restricting use of the trunk space while retracted. This design is commonly referred to as an internal storage design. Alternative designs have also included storage of the hard top above the vehicle trunk for purposes of simplifying the design and maintaining a pleasing appearance. Such designs are commonly referred to as an external storage design. However, such designs impede or prevent use of the vehicle trunk while the hard top is retracted and noticeably change the appearance of the vehicle profile. Therefore, a need exists for providing a retracting system that will allow external storage of the vehicle hard top that will not significantly affect the side profile of the vehicle and permit full use of the vehicle trunk space.

The present disclosure provides a solution to this and other problems known in the art, and offers other advantages over the prior art.

SUMMARY OF THE DISCLOSURE

The present disclosure relates to retractable vehicle roof systems which solve the above-mentioned problem.

In accordance with one embodiment, a roof retracting apparatus for a vehicle having a rearward storage space includes a roof portion movable between a closed position and an open position. The roof portion is located above a body of the vehicle and proximate the rearward storage space when in the closed position. A lid is located above the rearward storage space when the roof portion is in the closed position. The lid is configured to descend into the storage space as the roof portion moves to the open position above the lid while substantially preserving a side profile of the vehicle and permitting storage space access. The roof portion is located above the lid when the roof portion is in the open position. A glide control arrangement is operatively connected to the lid and configured to direct motion of the lid when the roof portion moves between the open and closed positions.

Another embodiment is directed to a method of retracting a rigid roof of a vehicle from a closed position to an open position for external storage over a rearward storage space while preserving a side profile of the vehicle and permitting access to the rearward storage space. The method utilizes a roof portion located above a body of the vehicle when the roof portion is in the closed position, a lid located above the rearward storage space when the roof portion is in the closed position, a rear window portion connected to the roof portion and to the lid, and a glide control arrangement operatively connected to the lid and configured to direct motion of the lid when the roof portion moves between the open and closed positions. The rear window portion is rotated toward the lid about a fulcrum between the rear window portion and the lid. The roof portion is rotated toward the rear window portion. While the rear window portion is rotated toward the lid, the lid is caused to recess into the rearward storage space using the glide control arrangement.

Additional advantages and features will be set forth in part in the description which follows, and in part, will become apparent to those skilled in the art upon examination of the following or may be learned by practice of the embodiments described herein.

DETAILED DESCRIPTION

Numerous vehicle hard top retracting systems exist, however the current systems available fail to provide an external open storage position above the vehicle storage lid while substantially preserving vehicle side profile and permitting storage space access. While various preferred embodiments are described herein, the scope of the disclosure is not intended to be limited to these particular embodiments.

Figure 1:
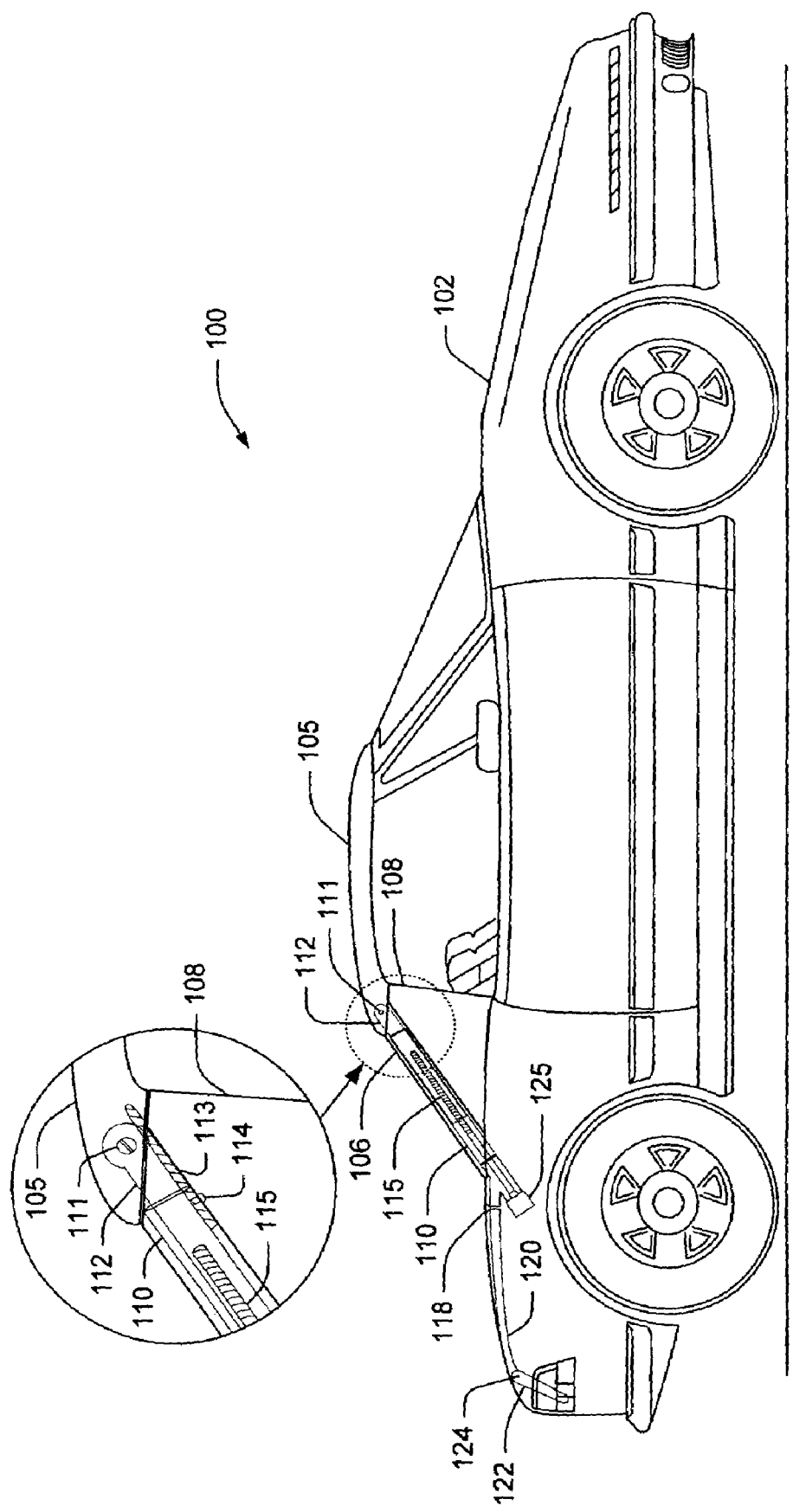
FIG. 1 is the side view of a vehicle with a rigid retractable roof viewed in the closed position.

FIG. 1 is a side view of one embodiment showing the roof retracting system 100 in the closed position. FIGS. 1-7 illustrate the progression of one embodiment of a retracting vehicle roof. For FIG. 1, the system 100 includes a vehicle 102 having a rigid retractable roof upper portion 105 which is attached to a lower roof portion 106. Also shown in this particular embodiment is a quarter panel, or side panel 108, which exists in some convertible roof designs in the event that no roll bar or similar structure has been incorporated. In one preferred embodiment a drive mechanism 110 may be utilized to raise and lower the upper roof portion 105 with respect to the lower roof portion 106 to assist in the retraction process. As depicted in FIG. 1, the drive mechanism 110 is operatively coupled to the upper roof portion 105 and extends to a rear storage lid of the vehicle, illustrated in FIG. 1 as having an upper lid portion 120 and a lower lid portion 122 (illustrated as a trunk lid). The upper lid portion 120 is affixed to the lower roof portion 106 at an upper hinge 118 and further attached at the opposite end by a lower hinge joint 124 to the lower lid portion 122. The construction of the drive mechanism 110 is preferably a durable material such as tube steel or composite material with similar strength and lightweight, such as a metal-loaded plastic. According to one embodiment, the drive mechanism includes a threaded rod drive that consists of a threaded rod 115 that traverses within an adjustable shaft 112 as driven by an extension motor 125. In one preferred embodiment, the motor 125 consists of a high starting torque, adjustable speed, reversible, parallel shaft DC motor similar to the N4975, manufactured by Bodine Electric Company, Chicago, Ill. The upper portion of the adjustable shaft 112 is fixed to the upper roof portion 105 at a hinge point 111. The expanded view of the drive mechanism 110 and the upper roof portion 105 illustrates that in one embodiment, the adjustable shaft 112 may be further supported by a brace 113 fastened to the adjustable shaft 112 with fastener 114.

Figure 2:
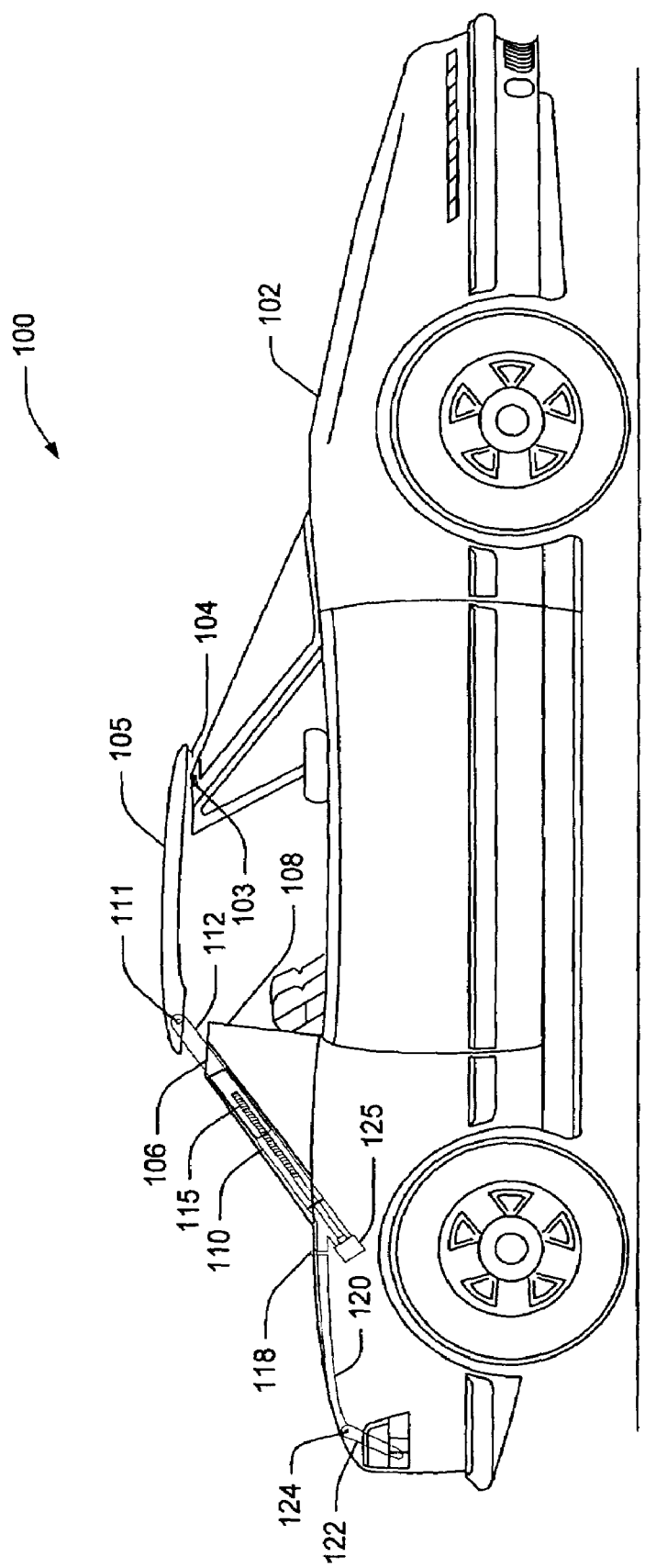
FIG. 2 is the side view of a vehicle with a rigid retractable roof viewed as the roof portion first moves from a closed to an open position.

FIG. 2 is the same roof retracting system 100 of FIG. 1 with a step toward retracting the roof of vehicle 102. This iteration illustrates how unlatching the hook 104 from the front window frame catch or hole 103 releases the front of the upper roof portion 105. In one embodiment the drive mechanism 110, as driven by operation of the extension motor 125, extends the adjustable piston or shaft 112, thereby separating the upper roof portion 105 from the lower roof portion 106.

Figure 3:
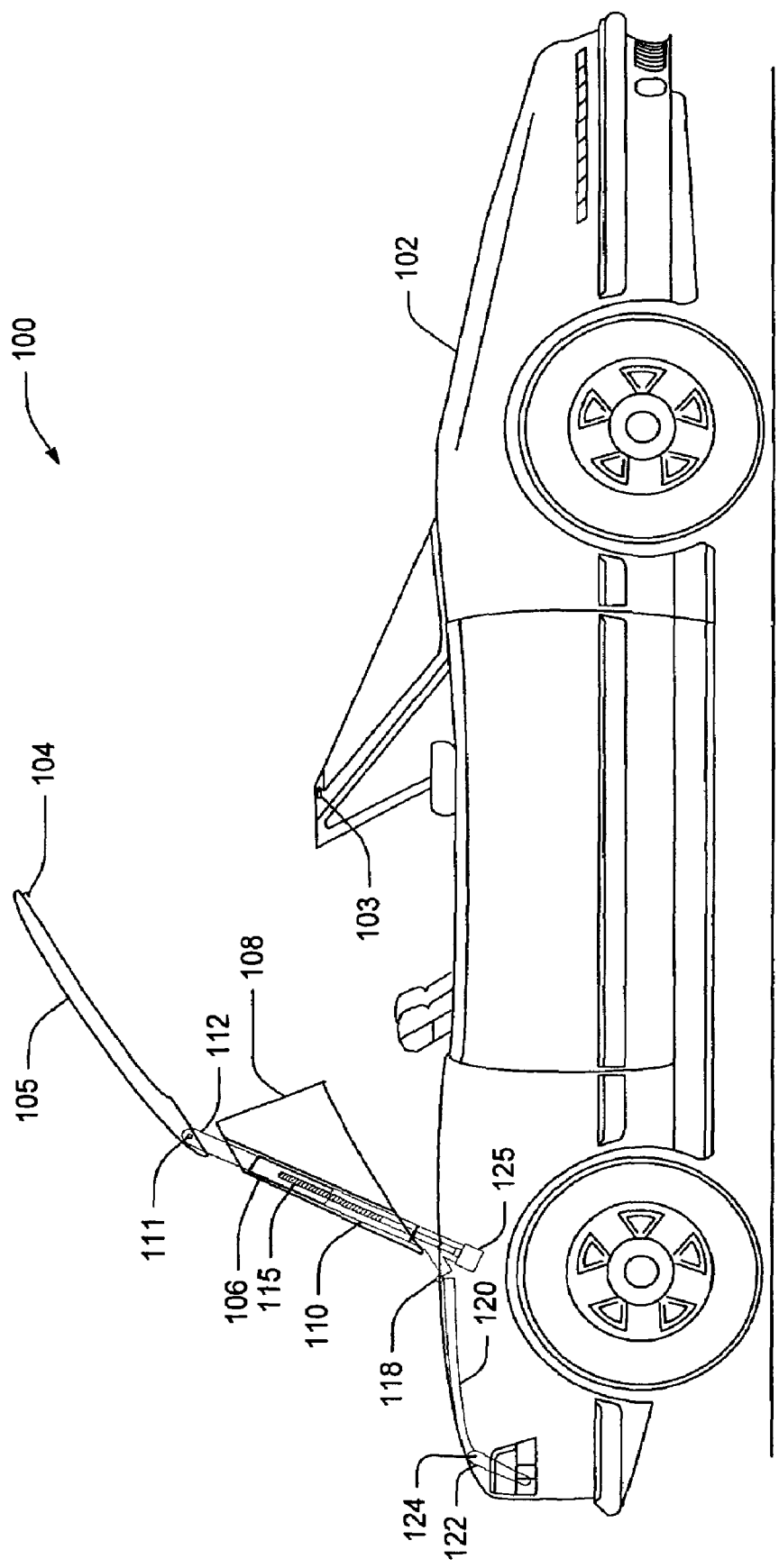
FIG. 3 is the side view of a vehicle with a rigid retractable roof viewed as the roof portion moves from a closed to an open position beyond that illustrated in FIG. 2.

FIG. 3 is a further step in the retracting of the roof of vehicle 102 using the roof retracting system 100 of FIGS. 1 and 2. This iteration illustrates the movement of both the upper roof portion 105 and the lower roof portion 106 by storage lid hinge 118. In one embodiment the force applied to move both roof portions aft the passenger compartment of vehicle 102 may be accomplished manually or by use of a drive motor. Details of alternative embodiments will be explained later in this description. According to one embodiment, a side panel 108 is hinged to lower roof portion 106 along the length of the drive mechanism 110. This allows for the side panel 108 to be rotated inward toward the opposite side of the vehicle 102 for low profile storage. In some embodiments, the side panel 108 can be folded or rotated inward manually, e.g., while pausing the movement of the upper roof portion 105 and the lower roof portion 106. In such embodiments, the movement of the upper roof portion 105 and the lower roof portion 106 resumes after the side panel 108 is folded or rotated inward. Conversely, when the roof is moved to the closed position, the movement of the upper roof portion 105 and the lower roof portion 106 can be paused to allow the side panel 108 to be folded or rotated outward manually and subsequently resumed after the side panel 108 is folded or rotated outward.

Figure 4:
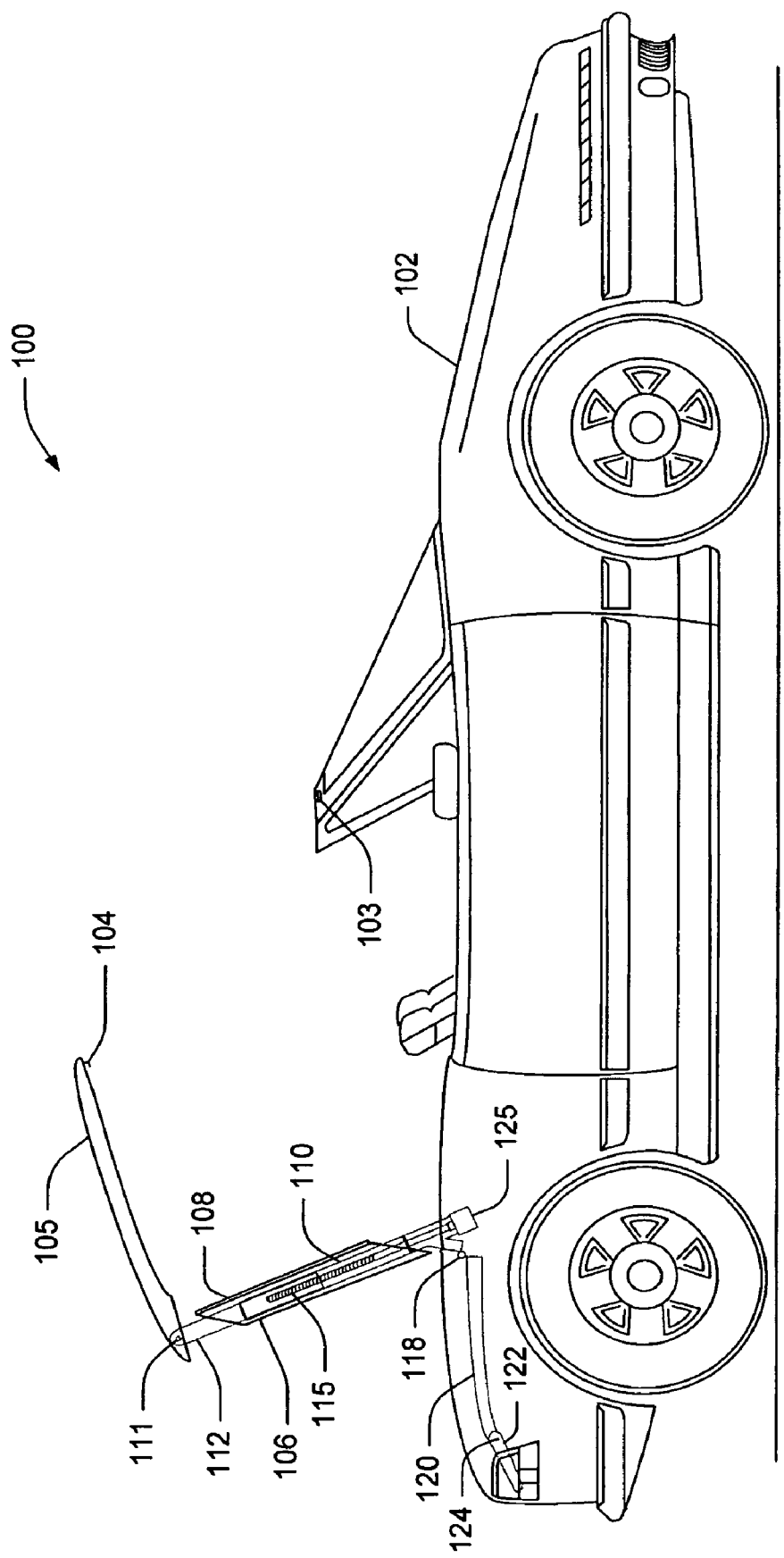
FIG. 4 is the side view of a vehicle with a rigid retractable roof viewed as the roof portion moves from a closed to an open position illustrating the folded rear quarter panels, beyond that illustrated in FIG. 3.

FIG. 4 is the same roof retracting system 100 of FIG. 1 with a further step toward retracting the roof of vehicle 102 beyond FIG. 3. This iteration illustrates the fully rotated side panel 108. Additionally shown is the upper roof portion 105 rotated to become flush with the surface of the lower roof portion 106, which is subsequently rotated to become flush with respect to the upper lid portion 120. According to one embodiment, lower lid portion 122 is rotated to become in line, adjacent to the upper lid portion 120 about lower lid pivot point 124. This illustration also shows the entire assembly of upper roof portion 105 and lower roof portion 106 with upper lid portion 120 and lower lid portion 122, descending downward toward the storage space of the vehicle 102.

Figure 5:
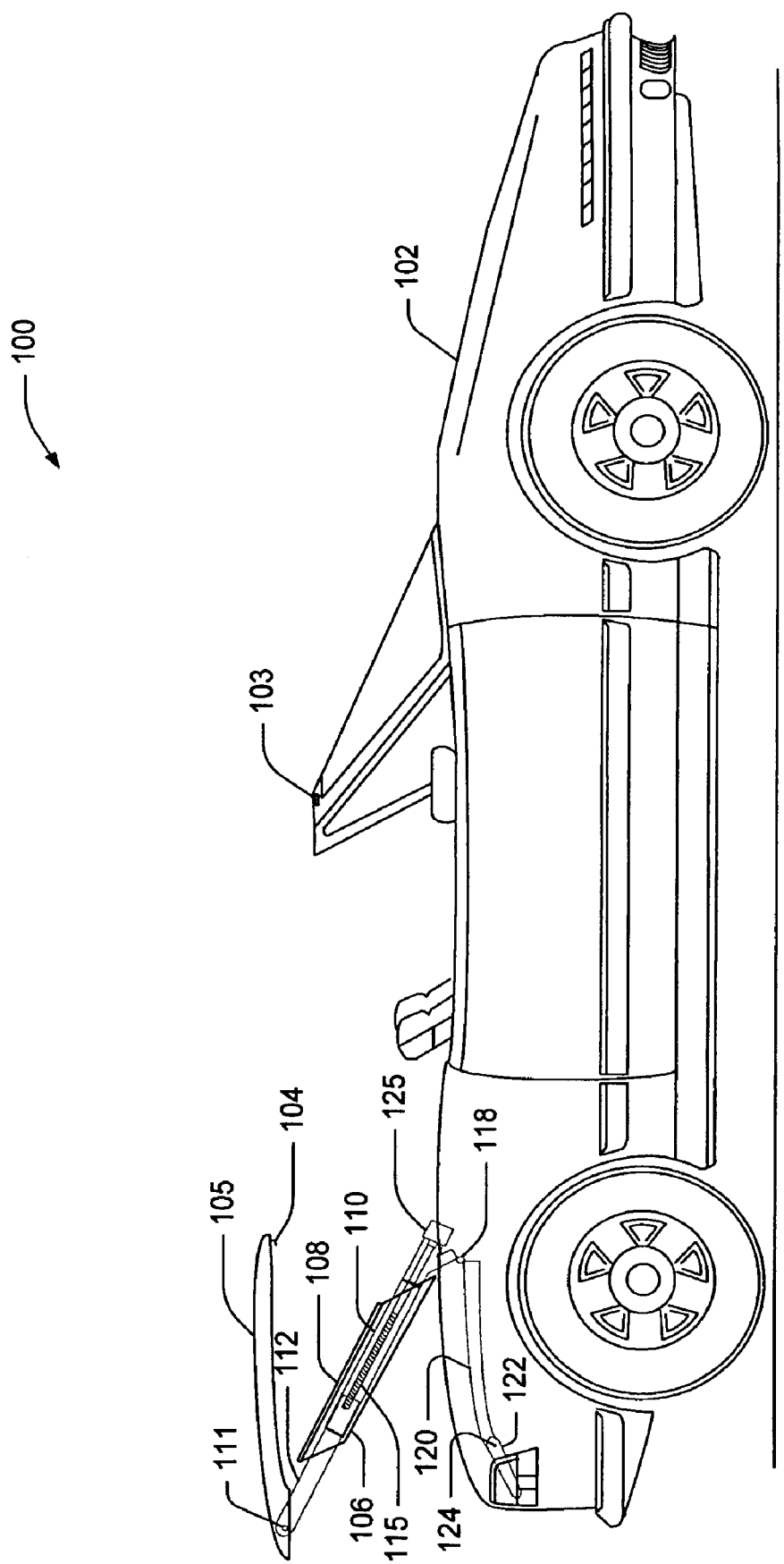
FIG. 5 is the side view of a vehicle with a rigid retractable roof viewed as the roof portion moves from a closed to an open position beyond that illustrated in FIG. 4.

FIG. 5 is the same roof retracting system 100 of FIG. 1 with a further step toward retracting the roof of vehicle 102 beyond FIG. 4. This iteration illustrates the fully extended adjustable shaft 112 in a direction opposite the upper storage lid 120, as driven by extension motor 125 within drive mechanism 110. This extension allows for the upper roof portion 105 to become more flush with the surface of the lower roof portion 106. Both upper roof portion 105 and lower roof portion 106 also rotate to become more flush with the surface of the upper storage lid 120 and lower storage lid 122.

Figure 6:
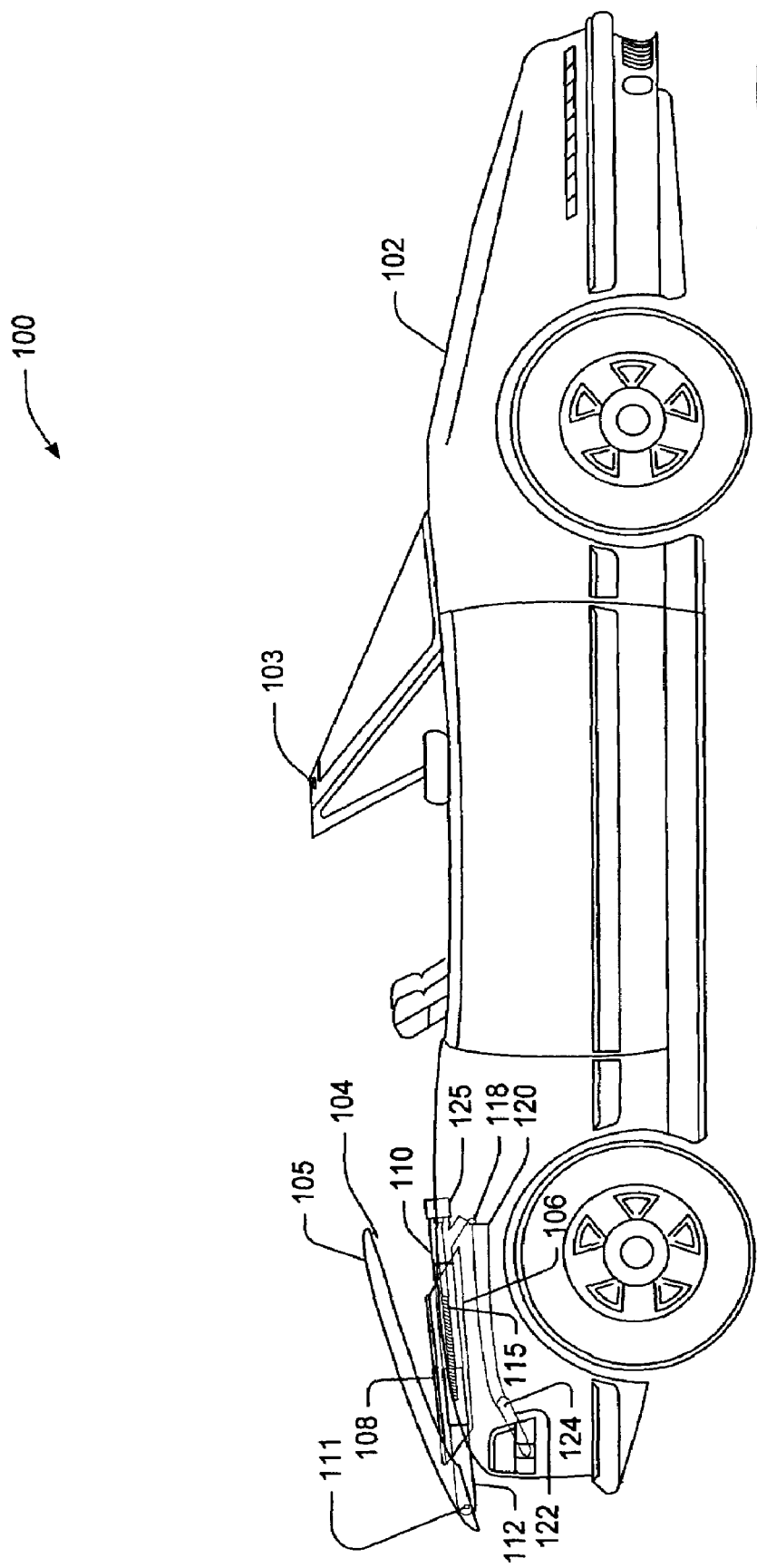
FIG. 6 is the side view of a vehicle with a rigid retractable roof viewed as the roof portion moves from a closed to an open position beyond that illustrated in FIG. 5

FIG. 6 is the same roof retracting system 100 of FIG. 1 with a further step toward retracting the roof of vehicle 102 beyond FIG. 5. This iteration illustrates the upper roof portion 105 rotated to become further flush with the surface of the lower roof portion 106, which is subsequently rotated to become further flush with the upper storage lid 120. This illustration also shows the entire assembly of upper roof portion 105 and lower roof portion 106 with upper lid portion 120 and lower lid portion 122, descending further downward toward the storage space of the vehicle 102. In one preferred embodiment, the final positioning of the upper lid portion 120 may be forward or rearward the vehicle body as is necessary to maintain vehicle side profile.

Figure 7:
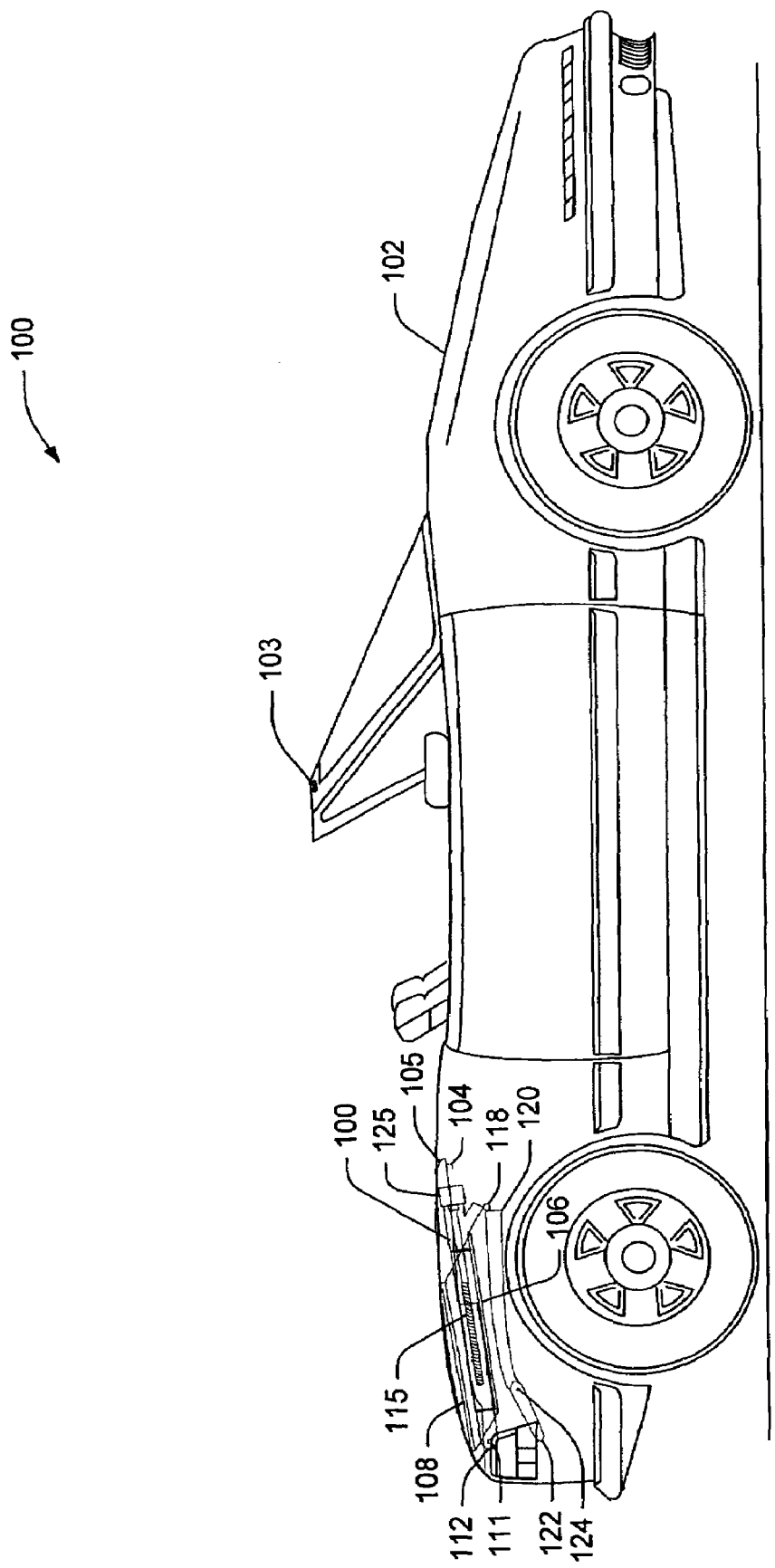
FIG. 7 is the side view of a vehicle with a rigid retractable roof viewed in the open, fully recessed position.

FIG. 7 is the same roof retracting system 100 of FIG. 1 according to one embodiment showing the roof retracting system 100 in the open position of vehicle 102 beyond FIG. 6. This position illustrates the fully rotated upper roof portion 105 to become more flush with the surface of the lower roof portion 106, which is fully rotated to become more flush with the surface of the storage lid 120. According to one embodiment, the adjustable shaft 112 is retracted in a direction toward the front of the vehicle 102 as driven by extension motor 125 within drive mechanism 110. This illustration also shows the entire assembly of upper roof portion 105 and lower roof portion 106 with upper lid portion 120 and lower lid portion 122, fully descended downward toward the storage space of the vehicle 102. It should be noted that the side view of the open position of the roof retracting system 100 preserves the side profile, if so desired, of the vehicle 102 such that the rear storage area appears similarly to that viewed in the closed position.

Figure 8:
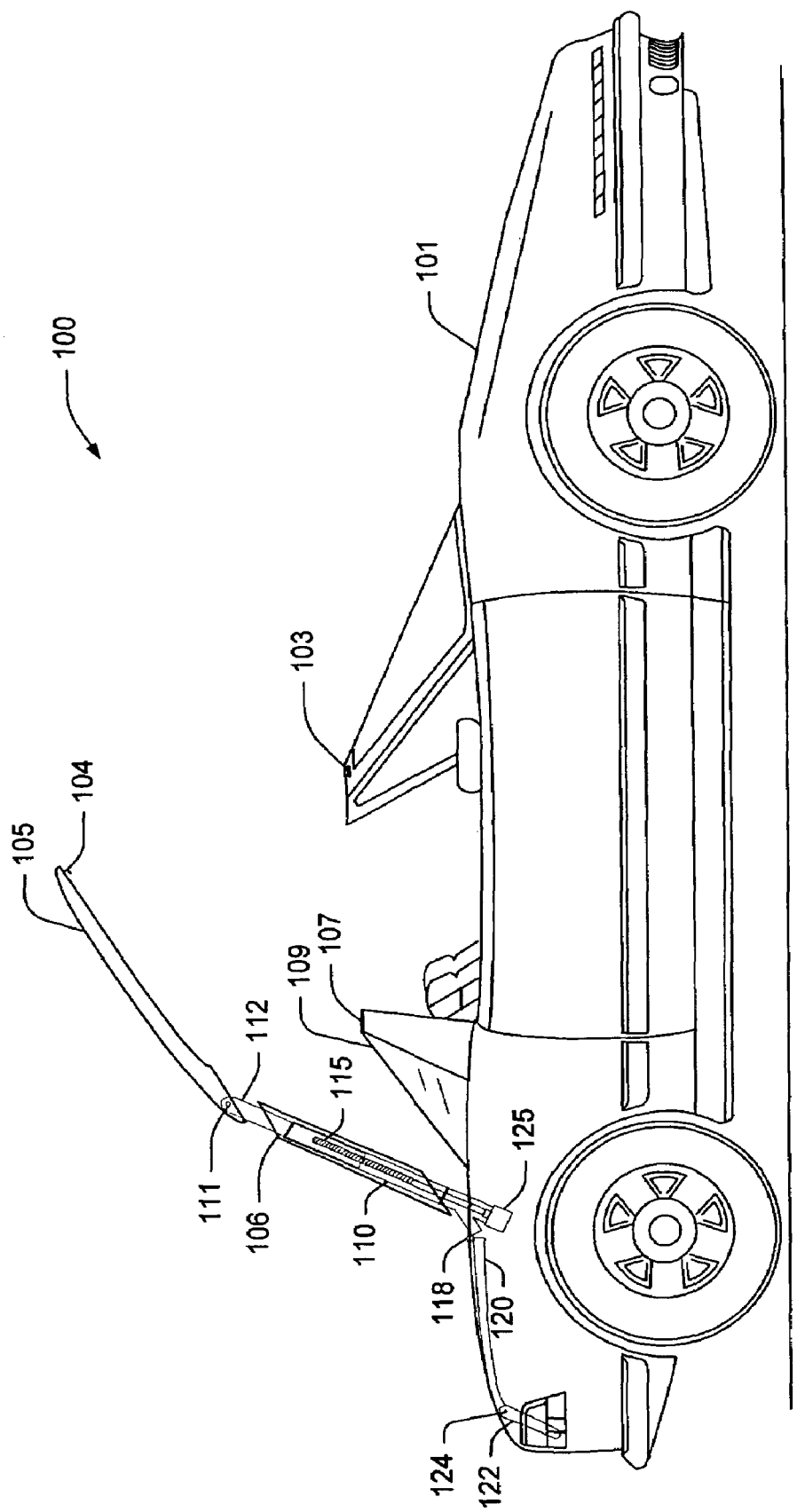
FIG. 8 is the side view of a vehicle with a rigid retractable roof, similar to FIG. 3, viewed as the roof portion moves from a closed to an open position and having a roll bar instead of rear quarter panels.

FIG. 8 illustrates one embodiment of the roof retracting system 100 such that a vehicle 101 has a fixed roll bar 107 and side panel 109. In this embodiment, there exists no hinged side panel 108 as shown in FIGS. 1-7. This illustration is most similar to FIG. 3.

Figure 9:
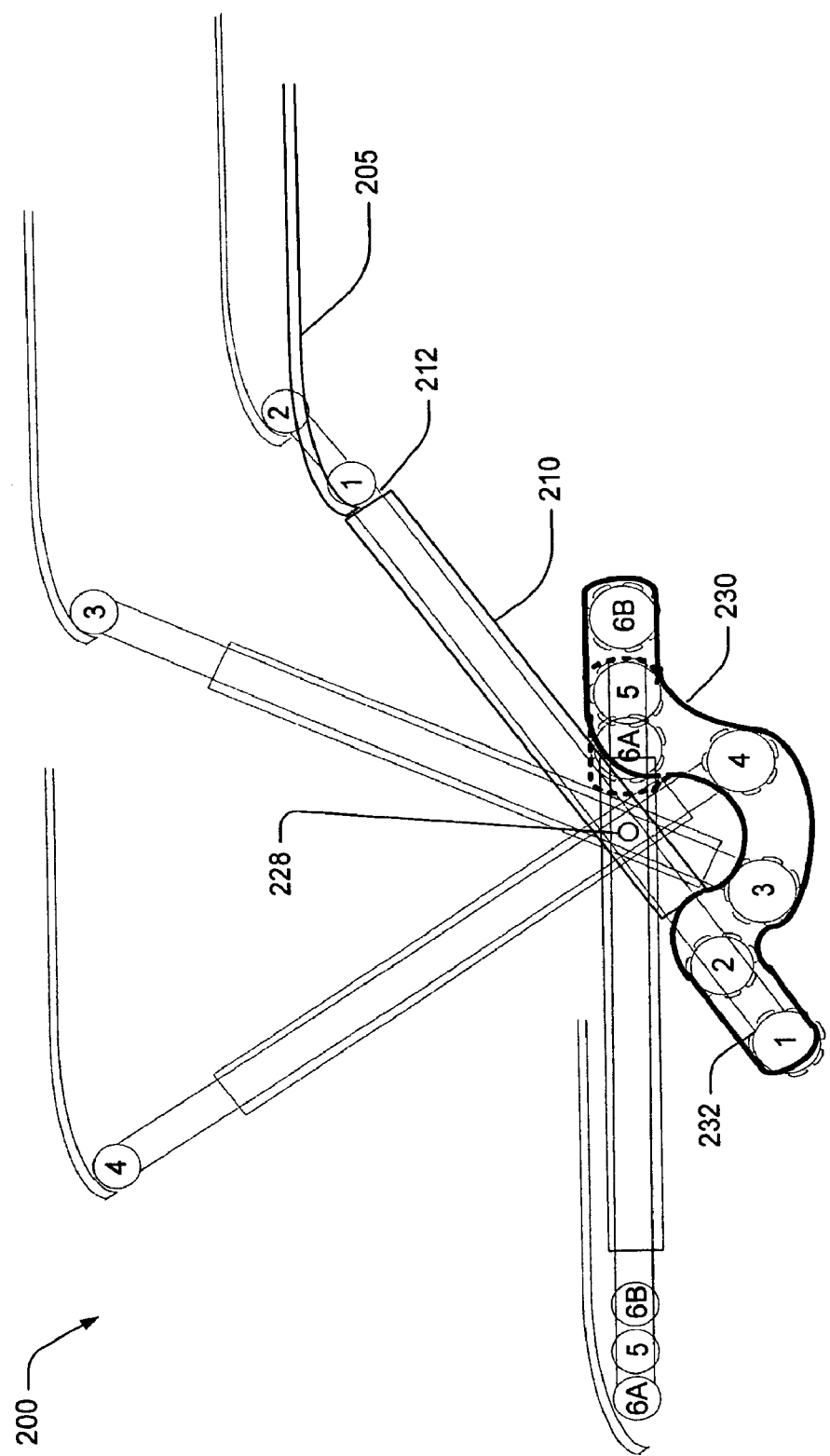
FIG. 9 is the side view of the track mechanism illustrating the various positions and numerically sequenced in ascending order from a closed to an open position.

FIG. 9 illustrates a side view of a rotational control mechanism 200 according to one embodiment of the roof retracting system 100. The numbered sequence is intended to show the different positions of a drive mechanism 210 as similarly illustrated in FIGS. 1-7. According to one embodiment, the drive mechanism 210 may be defined as a piston. An upper roof portion 205 is attached to one end of an adjustable shaft 212, while a cog 232 is attached to the opposite end. The cog 232 is designed to travel within a track 230, which is affixed to the side of a vehicle body (not shown). As the rotational control mechanism 200 rotates from the closed position 1 to the open position 6A or 6B, the entire mechanism 200 rotates about a fulcrum point 228. 6A represents one preferred final position in which the final assembly is extended rearward the vehicle body in order to maintain vehicle profile, if so desired. Alternatively, 6B represents one preferred final position in which the final assembly is extended forward the vehicle body in order to maintain vehicle profile, if so desired. Though this illustration shows the travel of the mechanism 200 to be directed by the track 230, it will be appreciated by those skilled in the art that the control may be performed manually or by automatic drive control such as a motor.

Figure 10:
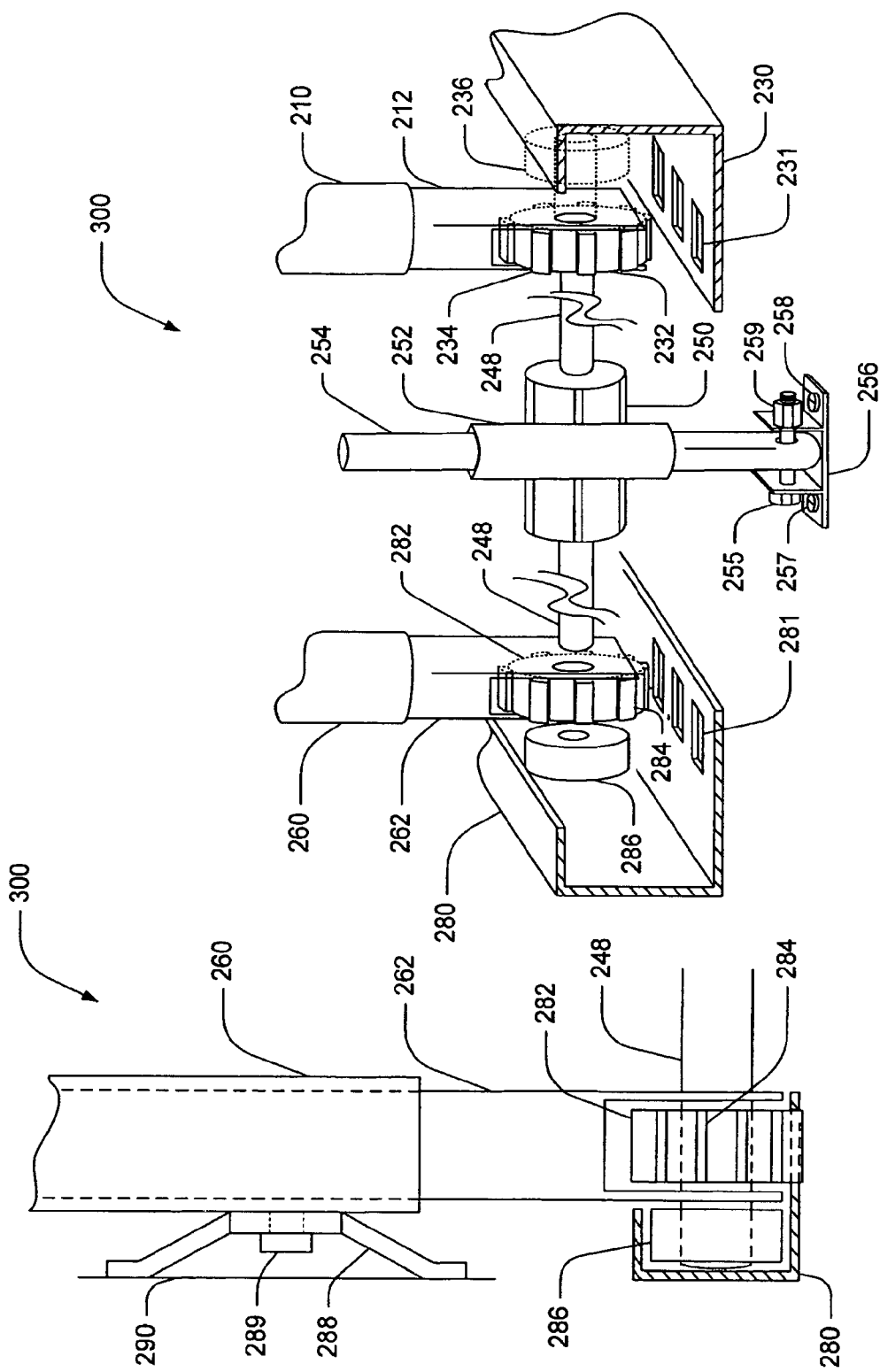
FIG. 10 is a perspective view of one preferred embodiment illustrating the cog and track mechanism, utilizing a piston and drive motor.

FIG. 10 is perspective view of a rotational control mechanism 300 according to one embodiment of the roof retracting system 100. Similar to FIG. 9, this illustration provides one embodiment utilizing two control mechanisms that may synchronously operate the roof retracting system 100 and further illustrates a forward view. The control mechanism 300 includes drive mechanisms 210 and 260 further consisting of adjustable shafts 212 and 262, respectively. Affixed at the base of each shaft 212 and 262 are cogs 232 and 282, which are designed to travel within tracks 230 and 280, respectively. According to one embodiment, the design of each cog, 232 and 282, includes tines 234 and 284 that mate with voids 231 and 281 of tracks 230 and 280, respectively. In one embodiment, travelers 236 and 286 assist the cogs 232 and 282 moving within the tracks 238 and 280. According to one aspect, the drive mechanisms 210 and 260 may be affixed by a shaft 248 that is driven by rotation gear motor 250. In one preferred embodiment, the motor 250 consists of a high starting torque, adjustable speed, reversible, right angle hollow shaft DC gear motor similar to the 7466, manufactured by Bodine Electric Company, Chicago, Ill. Further illustrated is a guide mechanism consisting of sleeve 252 which is attached to rotation motor 250 and is positioned around guide rod 254. The guide rod 254 may be flat or round in shape and is designed to be affixed to the vehicle body using an appropriate fastener 255 and 259 secured to a mounting plate 256. The mounting plate 256 is further attached to vehicle body with fasteners 257 and 258. The forward view of the rotational control mechanism illustrates one embodiment to show the drive mechanism 260 mounted to the vehicle body 290 utilizing bracket 288 with fastener 289.

Figure 11:
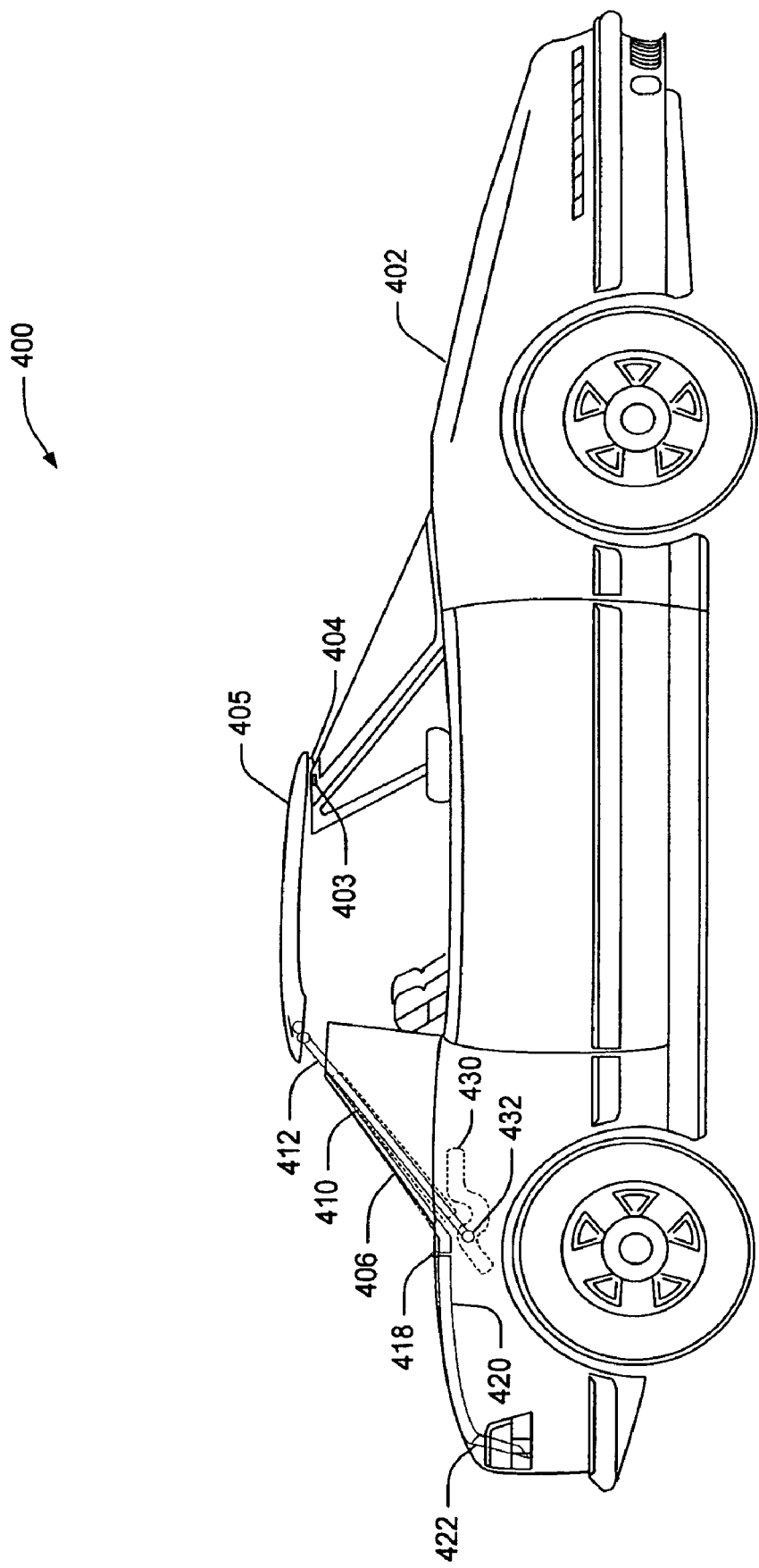
FIG. 11 is the side view of a vehicle with a rigid retractable roof, similar to FIG. 2, viewed as the roof portion moves from a closed to an open position and having a track mechanism similar to that shown in FIG. 10.

FIG. 11 illustrates a system 400, similar to FIG. 2, which includes a vehicle 402 having an upper roof portion 405 that attaches to window frame hole 403 with hook 404. The lower roof portion 406 having a drive mechanism 410, similar to FIG. 10, which includes adjustable shaft 412 that travels within track 430 as guided by cog 432. The lower roof portion 406 is further attached at the forward end of the upper storage lid 420 as affixed by upper hinge 418 and having a lower storage lid 422 at the rearward end. In one preferred embodiment, the vehicle may contain a roll bar, similar to that illustrated in FIG. 8.

Figure 12:
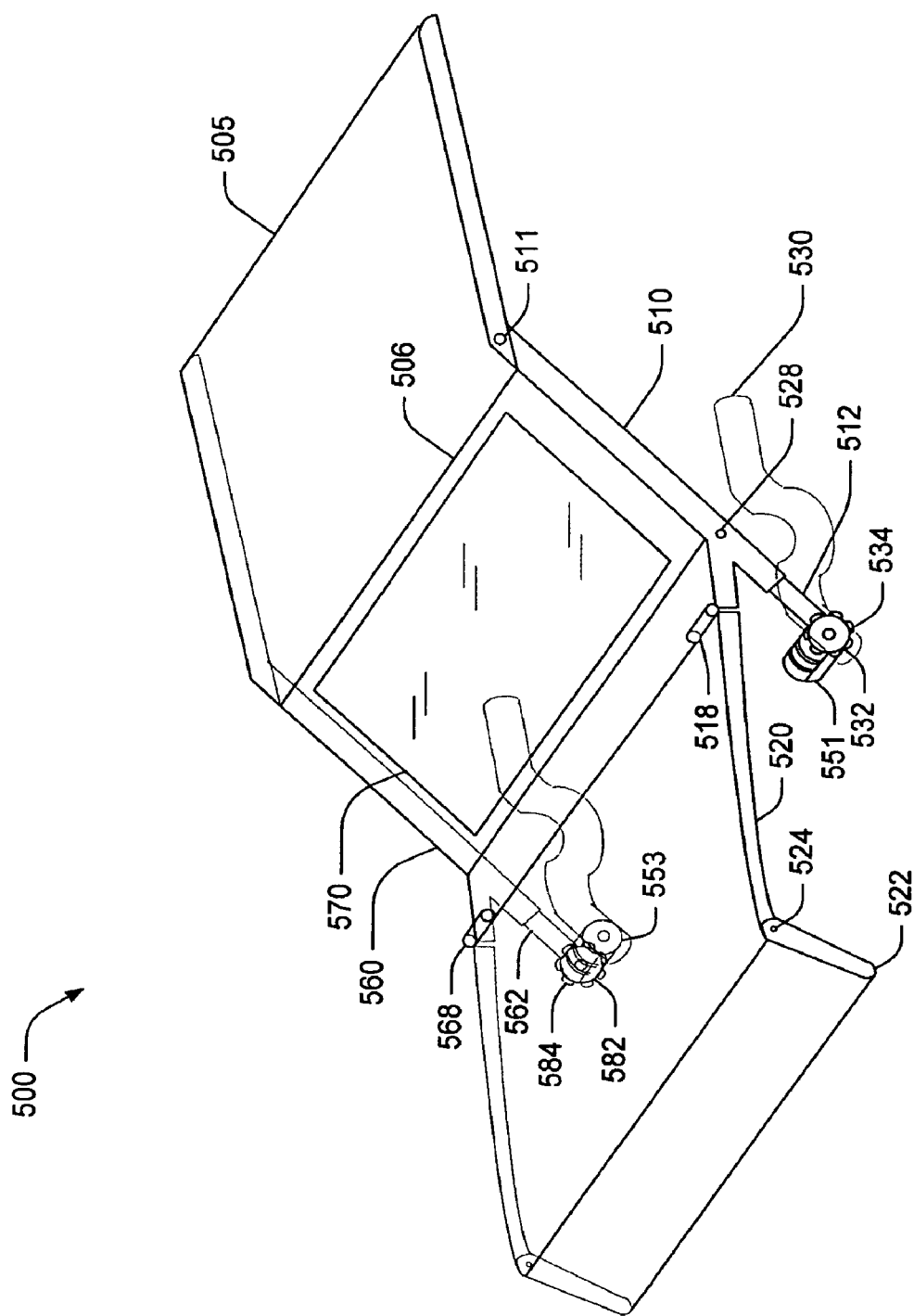
FIG. 12 is a perspective view of one preferred embodiment illustrating a cog and piston mechanism for each side of the roof portion, each having independent drive motors.

FIG. 12 illustrates a perspective view of a rotational control system 500 similar to that shown in FIGS. 9 and 10 as used on a roof retracting system 100 within the scope of this disclosure. Similar items are designated similarly to previous illustrations such that the upper roof portion 505, similar to FIG. 1 upper roof portion 105, is adjacent to drive mechanisms 510 and 560, positioned to rotate about fixed fulcrum 528. The rotation pivots the lower roof portion 506, containing window 570, with the upper lid 520 about hinge points 518 and 568. This is similarly labeled as elements of FIGS. 9 and 10 which include upper roof portion 205, drive mechanisms 210 and 260, rotating about fixed fulcrum 228. FIG. 12 illustrates one embodiment that may include independent cog gear motors 551 and 553 used to synchronously drive cogs 532 and 582, through their respective tracks 530 and 580, as guided by tines 534 and 584.

Figure 13:
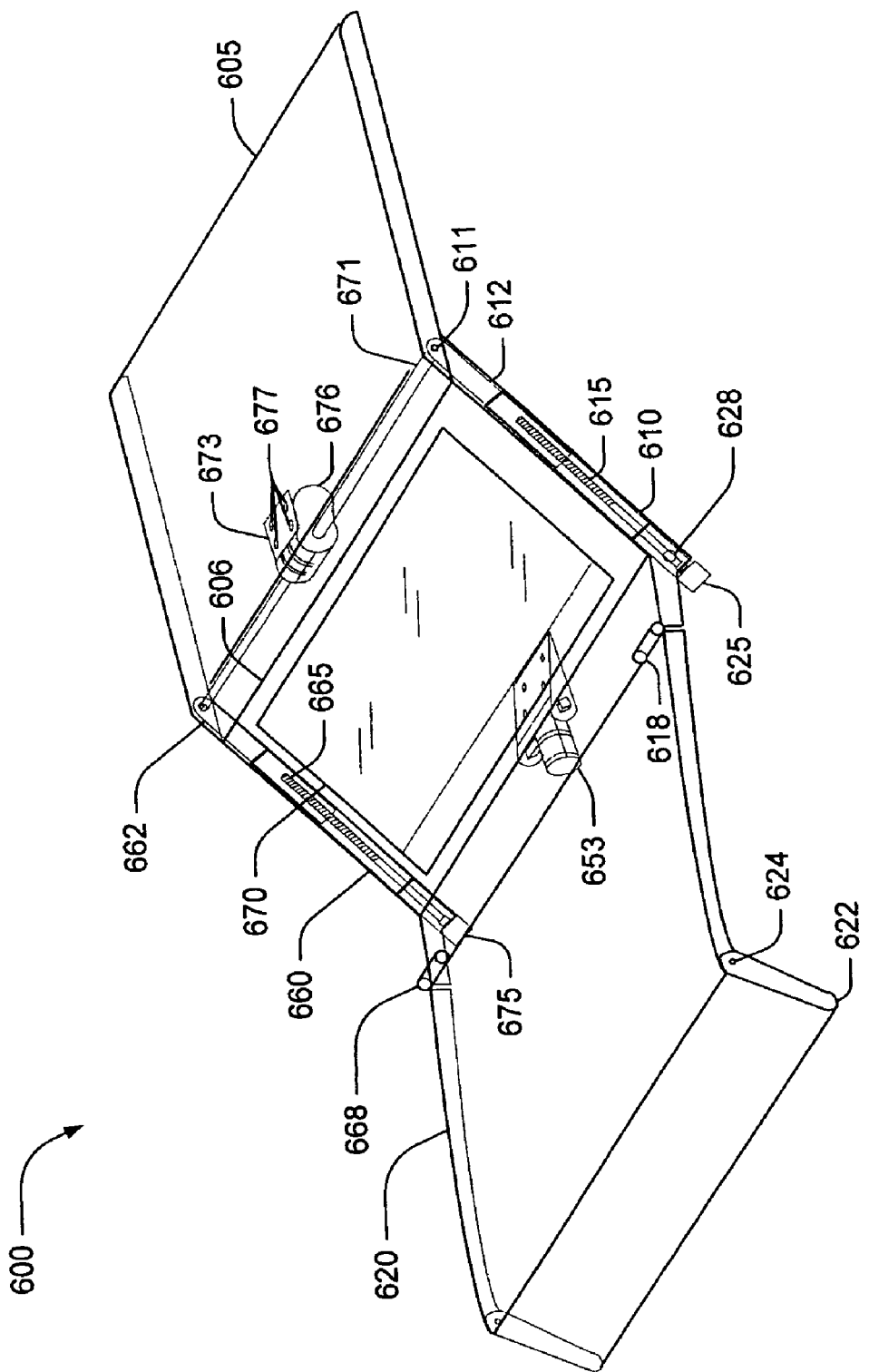
FIG. 13 is a perspective view of one preferred embodiment illustrating a threaded rod drive mechanism for each side of the roof portion driven from a single drive motor. Also illustrated is a drive motor at the top of the roof portion to drive movement of the upper roof portion in concert with the lower roof portion.

FIG. 13 illustrates a perspective view of a rotational control system 600, similar to that shown in FIG. 12, with like items designated similarly. In one embodiment, the extension motors 625 and 675 that drive adjustable shafts 612 and 662 may be synchronously controlled and of low torque capacity. To drive the rotation of the lower roof portion 606 in relation to the upper storage lid 620, rotational gear motor assembly 653 may be utilized to rotate about fixed fulcrum 628. Gear motor 675 can reduce the load placed upon rotational motor assembly 653 by assisting in the retraction of the upper roof portion 605 with respect to the lower roof portion 606. In one embodiment, gear motor 676 is fixed to upper roof portion 605 by mounting plate 673 with four fasteners 677. The gear motor 676 utilizes a roof shaft 671 to pivot the upper roof portion 605 to become flush with respect to the surface of the lower roof portion 606 about hinge point 611. In one preferred embodiment, a spring mechanism may be added to assist in reducing the load placed upon the gear motor 676.

Figure 14:
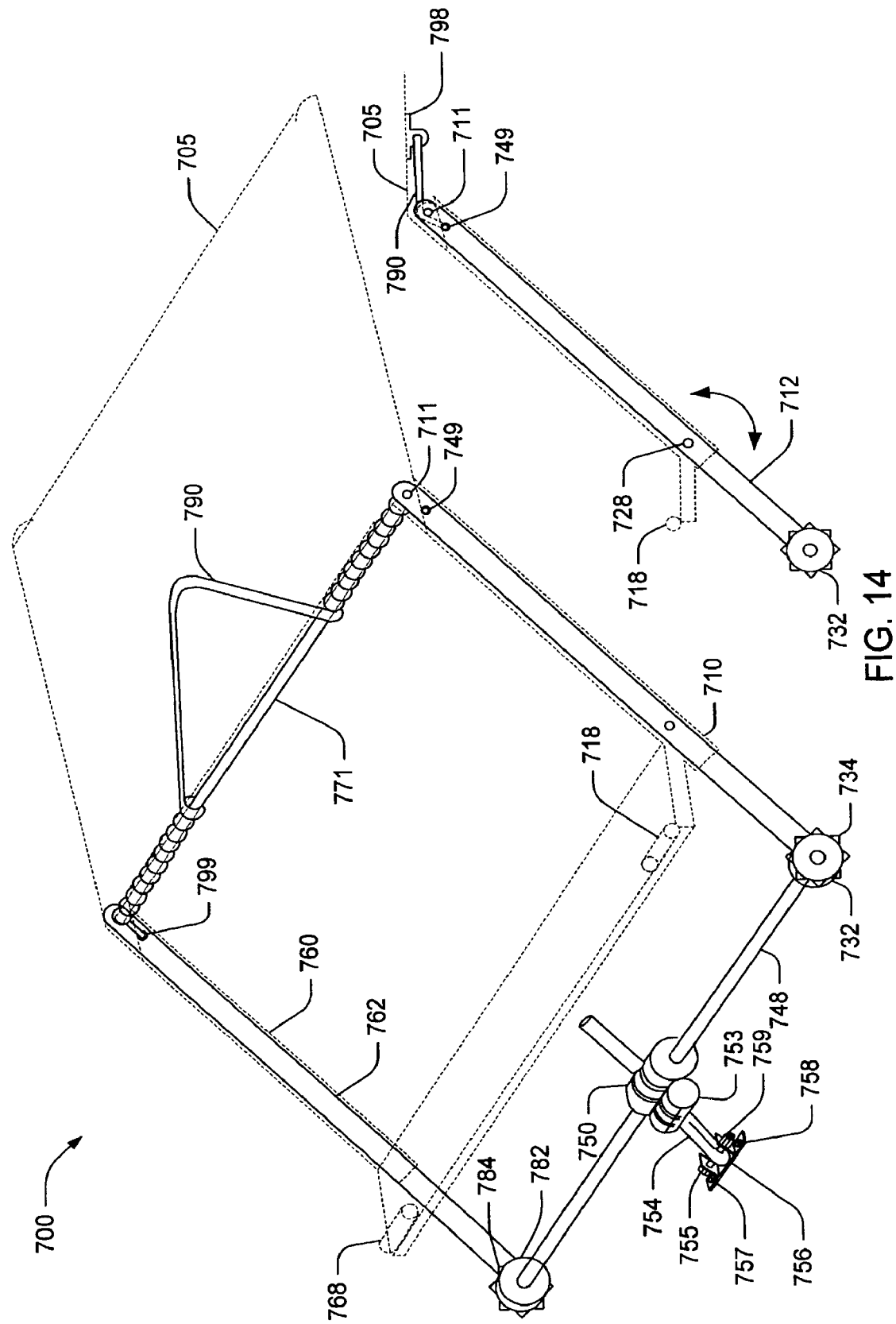
FIG. 14 is a perspective view of one preferred embodiment illustrating a cog and piston mechanism for each side of the roof portion driven from a single drive motor that is anchored to the vehicle. Also illustrated is a balancing spring mechanism at the top of the roof portion to facilitate movement of the upper roof portion in concert with the lower roof portion.

FIG. 14 illustrates a perspective view of a rotational control system 700, similar to that shown in FIG. 13, with like items designated similarly. Lower roof portion 706 is similar to 506, shown in FIG. 12. Hinges 518 and 568, shown in FIG. 12, are similar to hinges 718 and 768. Cogs 732 and 782, having tines 734 and 784, are similar to cogs 532 and 582, having tines 534 and 584. In one embodiment, the gear motor 675 of FIG. 13 is replaced by a spring 790 and gear box 753, to assist the load placed upon rotation motor 750. Spring 790 is coiled about roof shaft 771 that extends between the two sides of the hinge point 711 of the upper roof portion 705. Anchor holes 749 and 799 of the drive mechanisms 710 and 760 provide tension on the spring 790. The spring 790 is further anchored to upper roof portion 705 with roof plate 798. In one preferred embodiment, spring 790 is of steel construction or similar strength composite material.

Figure 15:
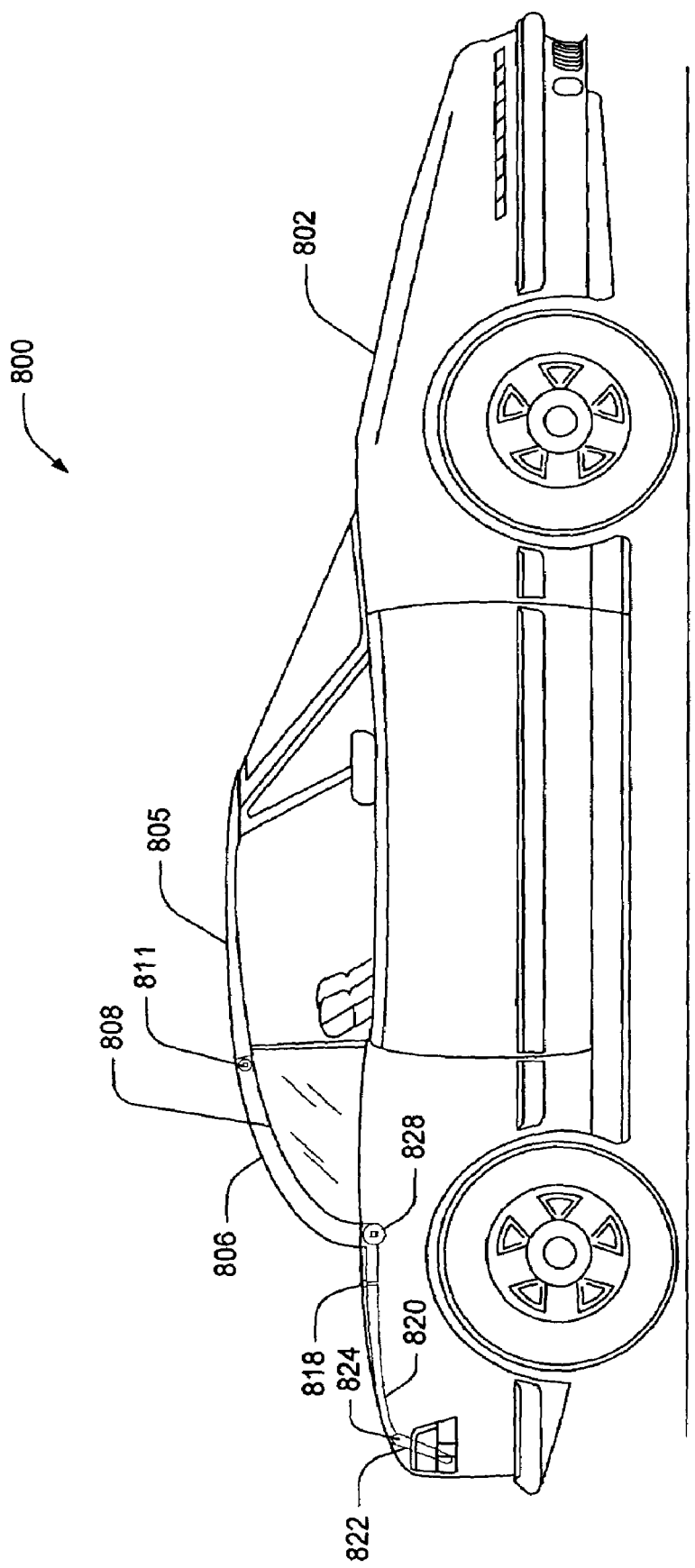
FIG. 15 is the side view of a vehicle with a rigid retractable roof, similar to FIG. 1, viewed in the closed position and having rear quarter panel windows that roll down into the vehicle body instead of retracting as part of the roof.
Figure 16:
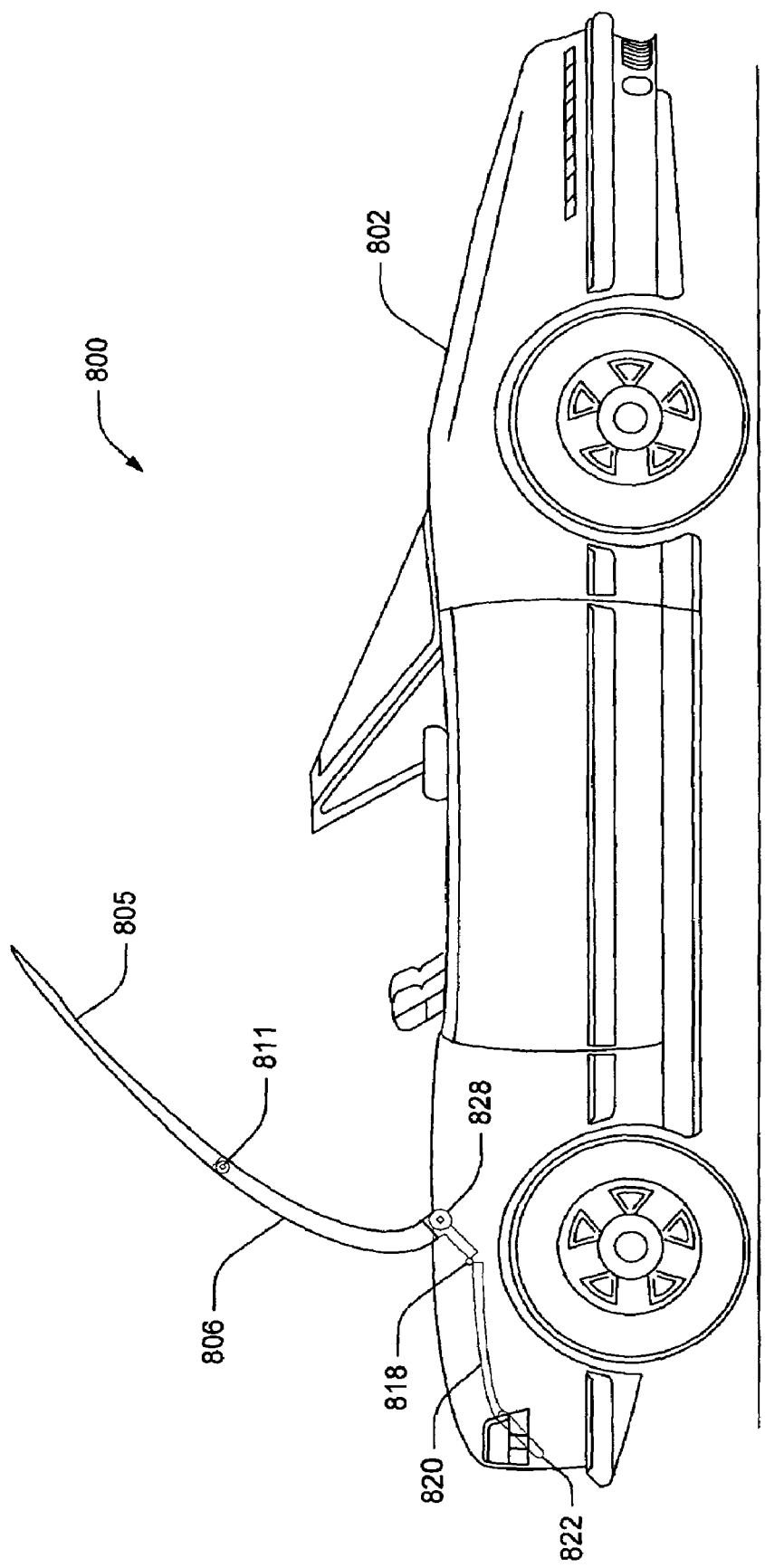
FIG. 16 is the side view of a vehicle with a rigid retractable roof, similar to FIG. 3, viewed as the roof portion moves from a closed to an open position and having rear quarter panel windows that roll down into the vehicle body instead of retracting as part of the roof.
Figure 17:
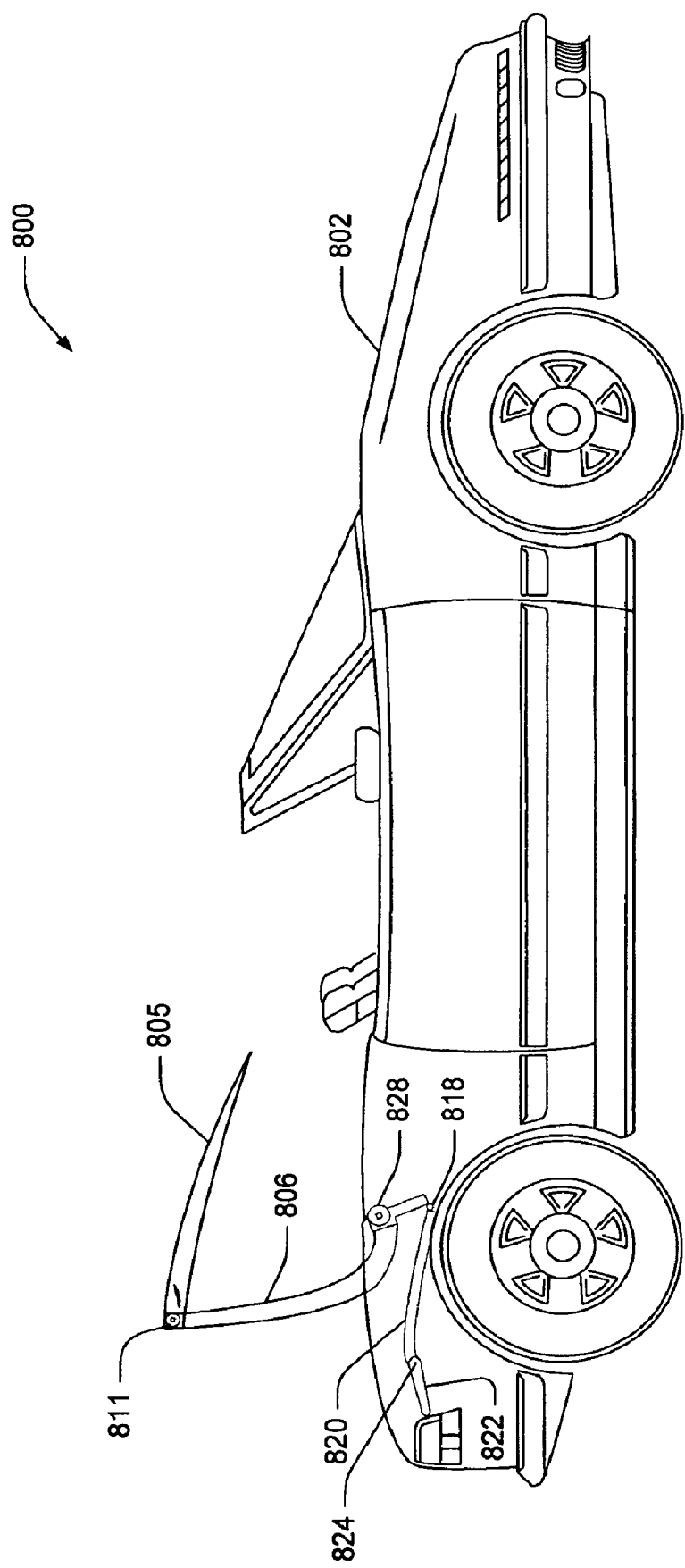
FIG. 17 is the side view of a vehicle with a rigid retractable roof, similar to FIG. 5, viewed as the roof portion moves from a closed to an open position and having rear quarter panel windows that roll down into the vehicle body instead of retracting as part of the roof.

FIGS. 15-17 illustrate a roof retracting system 800 similar in sequence to that of FIGS. 1, 3, and 5, with like items designated similarly. A vehicle 802 of such an embodiment having an upper roof portion 805 and lower roof portion 806 residing above a detached side window 808, pivoting at hinge point 811. During the process of moving the roof retracting system 800 from a closed position to an open position, the side window 808 is independently lowered into the vehicle body by manual or powered systems. Items 818, 820, 822, 824 and 828 are similar to like items 518, 520, 522, 524 and 528, respectively, as shown in FIG. 12.

Figure 18:
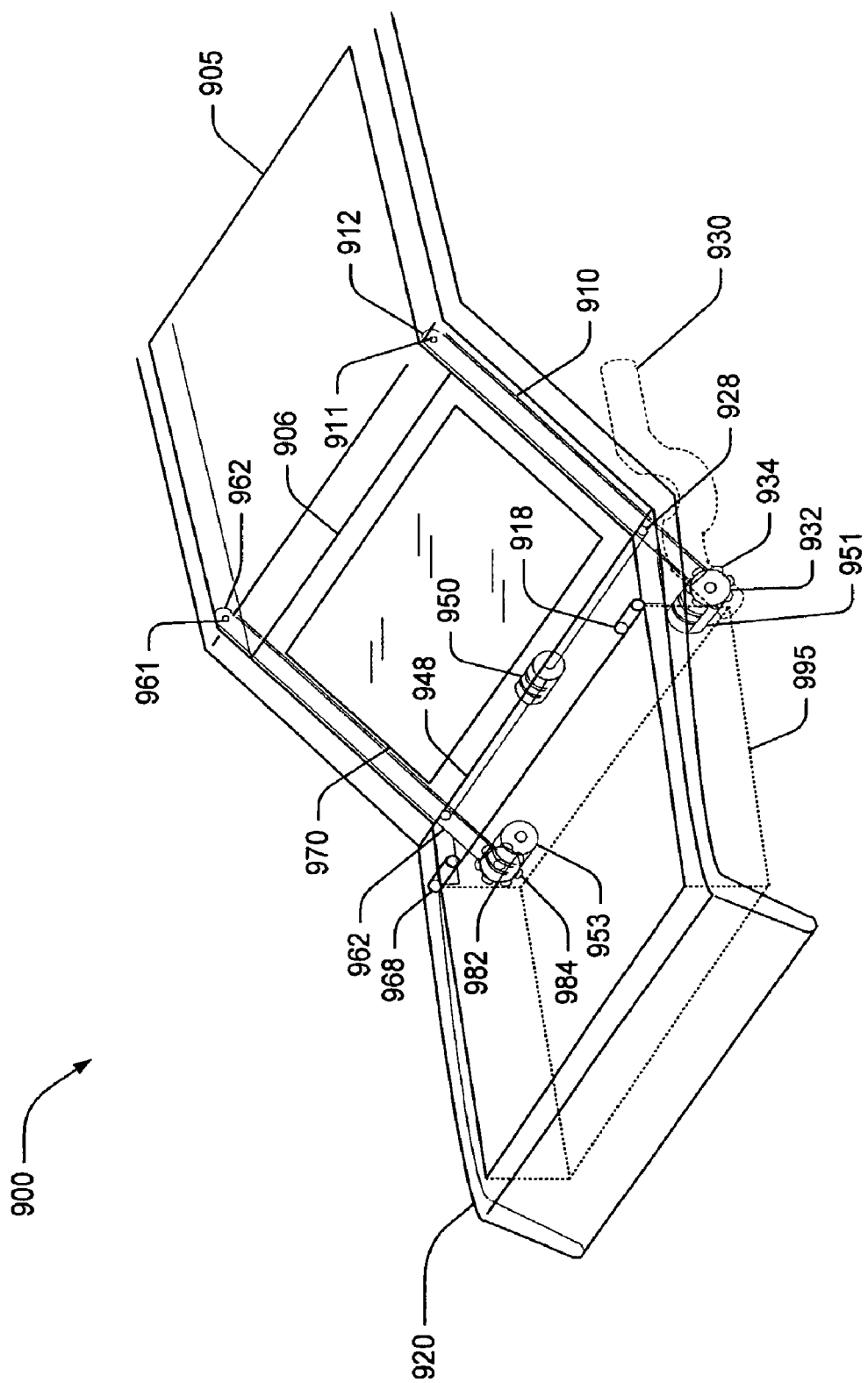
FIG. 18 is a perspective view of one preferred embodiment illustrating a cog and piston mechanism driven from multiple drive motors, similar to that shown in FIG. 13. Also illustrated is a storage space incorporated as part of the storage lid.
Figure 19:
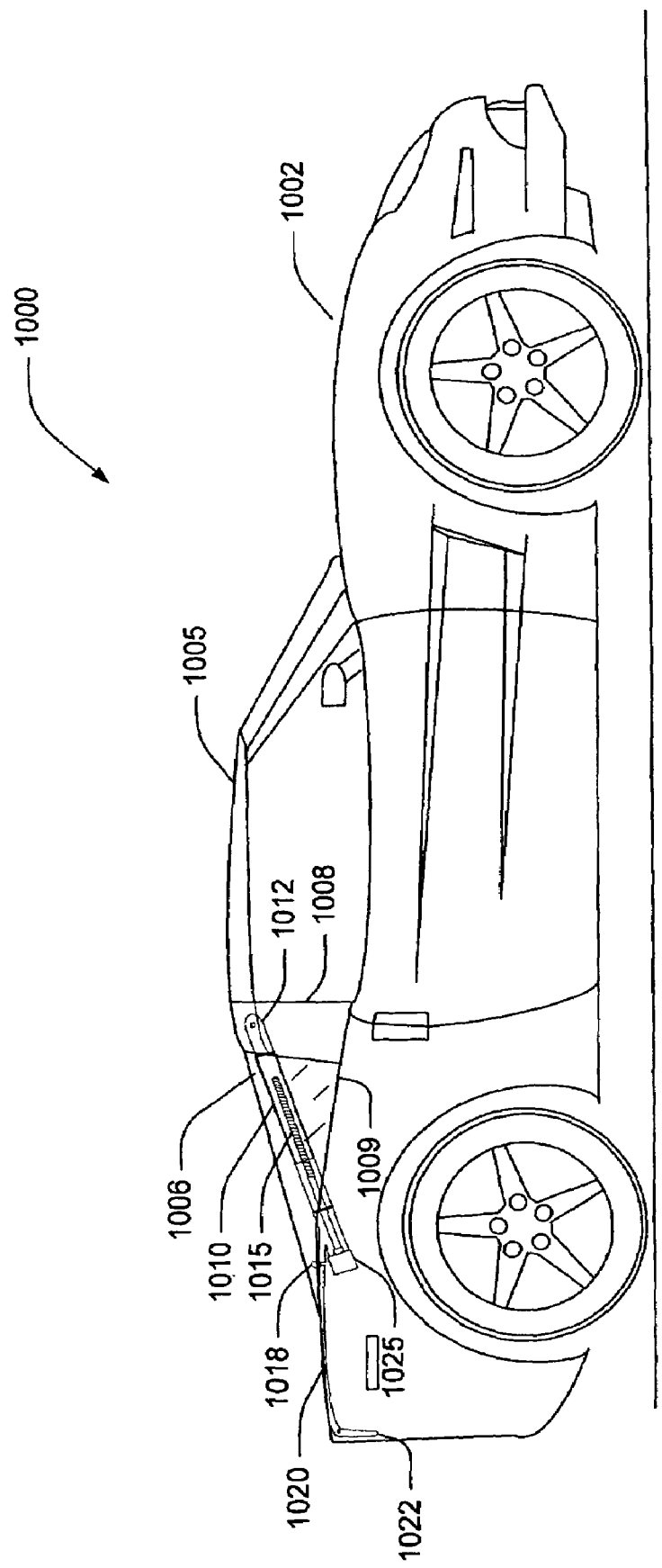
FIG. 19 is the side view of a vehicle with a rigid retractable roof, similar to FIG. 1, viewed before the roof portion moves from a closed to an open position and having the rear quarter panels remain in place.
Figure 20:
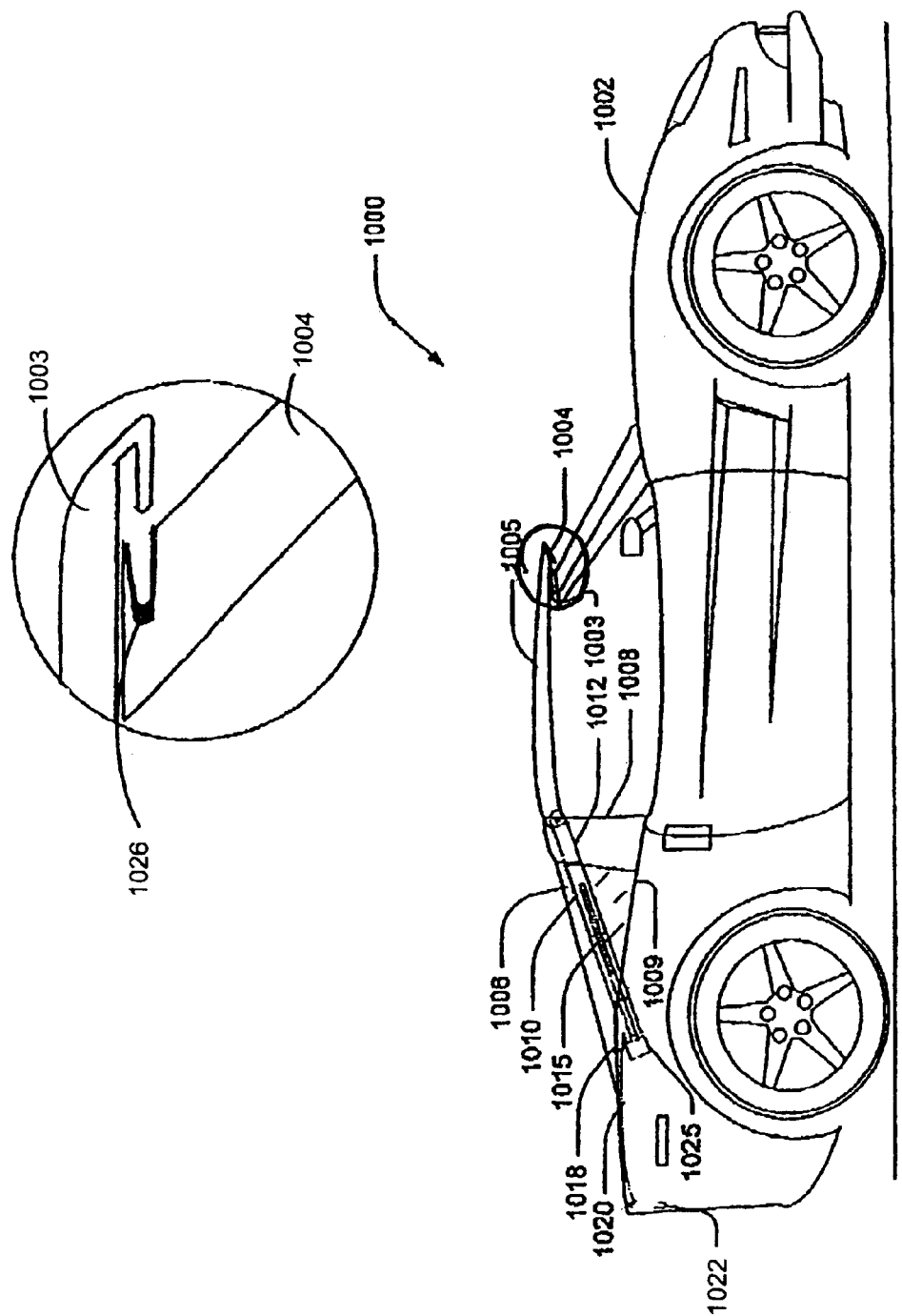
FIG. 20 is the side view of a vehicle with a rigid retractable roof, similar to FIG. 2, viewed as the roof portion moves from a closed to an open position and having the rear quarter panels remain in place.
Figure 21:
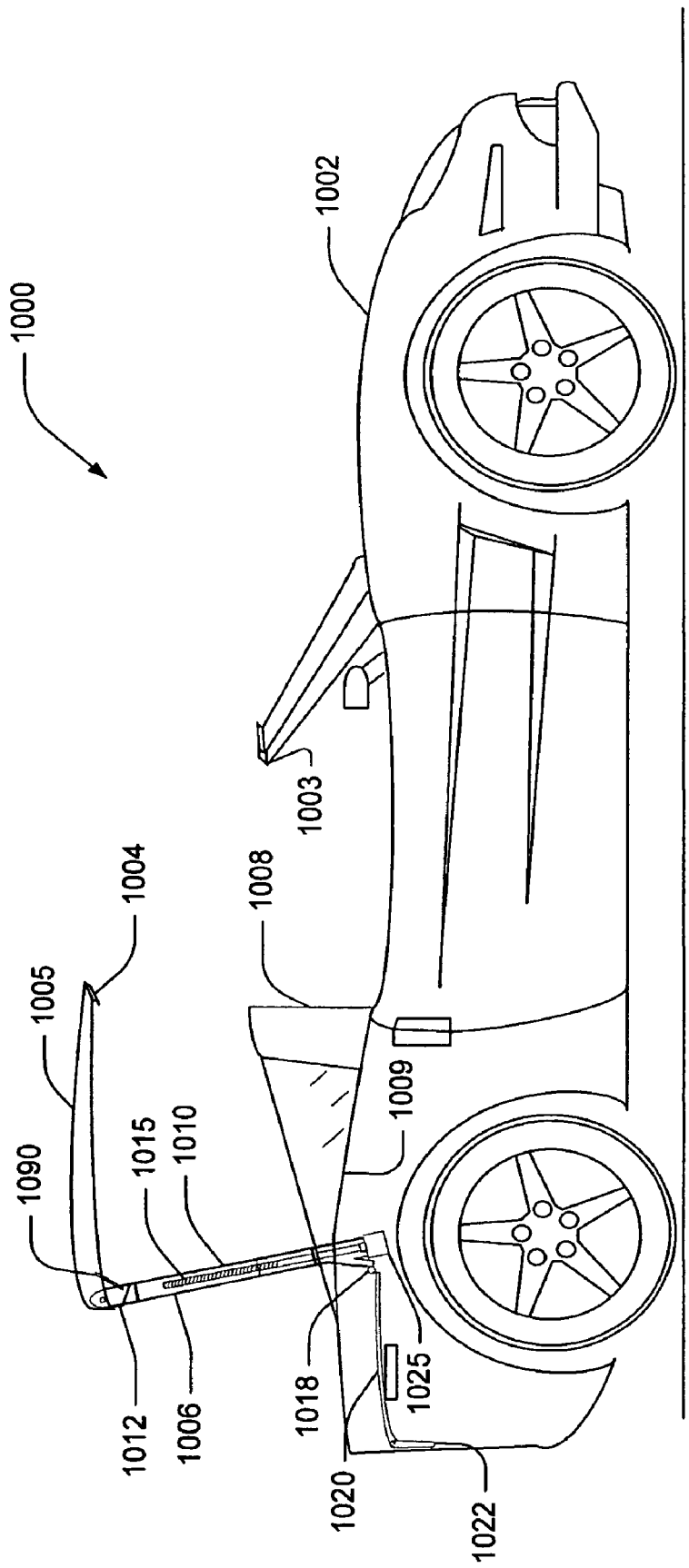
FIG. 21 is the side view of a vehicle with a rigid retractable roof, similar to FIG. 4, viewed as the roof portion moves from a closed to an open position and having the rear quarter panels remain in place.
Figure 22:
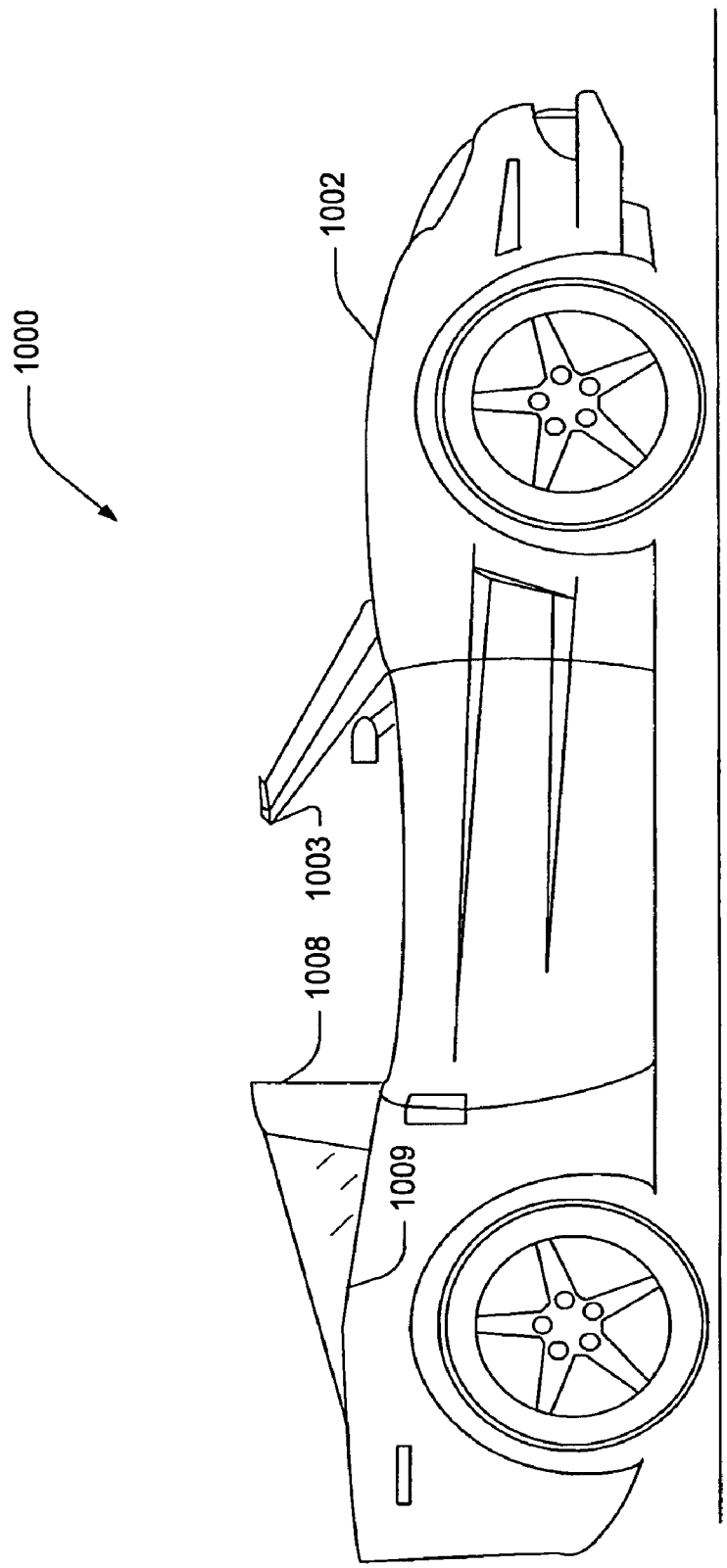
FIG. 22 is the side view of a vehicle with a rigid retractable roof, similar to FIG. 7, viewed in the open position and having the rear quarter panels remain in place.

FIG. 18 illustrates a perspective view of a roof retracting system 900, similar to FIG. 13, with like items designated similarly. According to one embodiment, the rotation motor is mounted parallel to the axis of the fixed fulcrum 928 about shaft 948. Additionally, contained within the upper storage lid 920 is a storage space 995 of sufficient size to contain the upper and lower roof portions while in the open position. In one preferred embodiment, gear motor 950 may be utilized to assist in the retracting operation. Items designated as 905, 910, 906, 911, 912, 918, 930, 932, 934, 951, 953, 961, 962, 968, 970, 982 and 984 correspond to the similarly labeled designators as 505, 510, 506, 511, 512, 518, 530, 532, 534, 551, 553, 561, 562, 568, 570, 582 and 584, respectively, as shown in FIG. 12.

FIGS. 19-22 illustrate a side view of a roof retracting system 1000, similar to FIG. 1, 2, 4 and 7, with like items designated similarly. According to one embodiment, an upper roof portion 1005 of a vehicle 1002 incorporates only the center portion of a lower roof portion 1006, leaving a side panel 1008 that remains fixed during the movement from a closed to an open position. Alternatively, in one preferred embodiment there may be included a roll bar that remains intact, similar to that illustrated in FIG. 8. Also illustrated is a window portion 1009 that will remain adjacent to the side panel 1008. In one preferred embodiment, the continuous latching mechanism includes a roof hook 1004 that runs continuously along the front surface of the upper roof portion 1005. The roof hook 1004 mates with a corresponding continuous window frame latch or catch 1003 formed in one embodiment as a U- or V-shaped groove, located along the front surface when in the closed position. In one preferred embodiment, the catch 1003 preferably includes a gasket or seal 1026 within the groove to improve the mechanical seal as well as accommodate variation in the mating or registration of the upper roof portion 1005 and the catch 1003. The lower roof portion 1006 consists of only the center portion of the roof. This is similar to a roll bar design of FIG. 8 but having no frame between left and right side panels. It can be appreciated by those skilled in the art that various drive mechanisms may be implemented to assist in the movement from a closed position to an open position. Items designated as 1010, 1015, 1018, 1020, 1022 and 1025 correspond to the similarly labeled designators as 510, 515, 518, 520, 522, and 525, respectively, as shown in FIG. 12.

Figure 23:
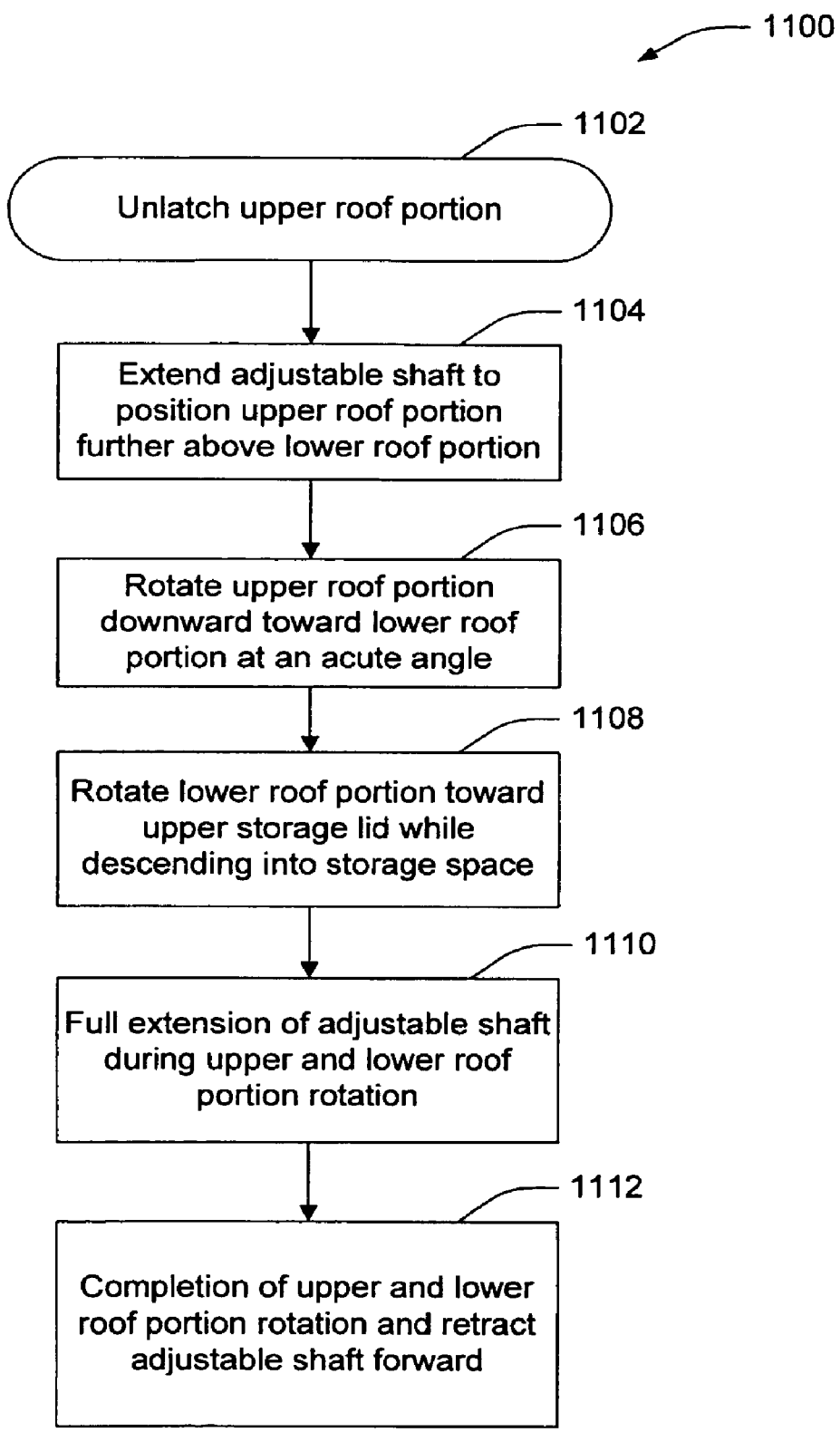
FIG. 23 is a flow diagram of a method of retracting a rigid vehicle roof from a closed to an open position utilizing a system similar to that illustrated in FIG. 1-7.

FIG. 23 shows a flow diagram 1100 illustrating a method of retracting a hard top roof of a vehicle. The unlatch step 1102 includes disconnecting the hook 104 of the upper roof portion 105 from the catch or window frame hole 103. The separation of the upper roof portion 105 from the frame hole 103 allows the extension of the adjustable shaft 112, in step 1104, thereby positioning the upper roof portion 105 further above the lower roof portion 106 to provide sufficient space to rotate, becoming more flush therewith. The rotation of upper and lower roof portions step 1106 begins to position the upper roof portion 105 to become flush with the surface of the lower roof portion 106 and leads to the rotate and descending step 1108. In step 1108, the lower roof portion 106 begins to become progressively more flush with respect to the surface of the upper storage lid 120 about the fixed fulcrum 228 at the upper hinge 118 and both upper roof portion 105 and lower roof portion 106. As the lower roof portion 106 continues to rotate, both upper storage lid 120 and lower storage lid 122 begin to descend downward into the storage space below the upper storage lid 120 and lower storage lid 122. In full extension step 1110, the adjustable shaft 112 is fully extended to allow increased separation of the upper roof portion 105 and the lower roof portion 106 at the pivot point 111. The purpose of the full extension is to allow the upper roof portion 105 and lower roof portion 106 to fold as flush with respect to one another as is possible for compact storage when the system reaches the open position. At the point the upper roof portion 105 and lower roof portion 106 become flush with the upper storage lid 120, step 1112 provides the retraction of the adjustable shaft 112 in a direction toward the front of the vehicle 102 until both the upper storage lid 120 and the lower storage lid 122 become fully descended downward toward the storage space of the vehicle 102. A latching or locking mechanism is incorporated to hold the portions in place while stored. Upon completion of the final step (1112), the side view of the open position of the roof retracting system 100 preserves the side profile of the vehicle 102 such that the rear storage area appears similarly to that viewed in the closed position.

Figure 24:
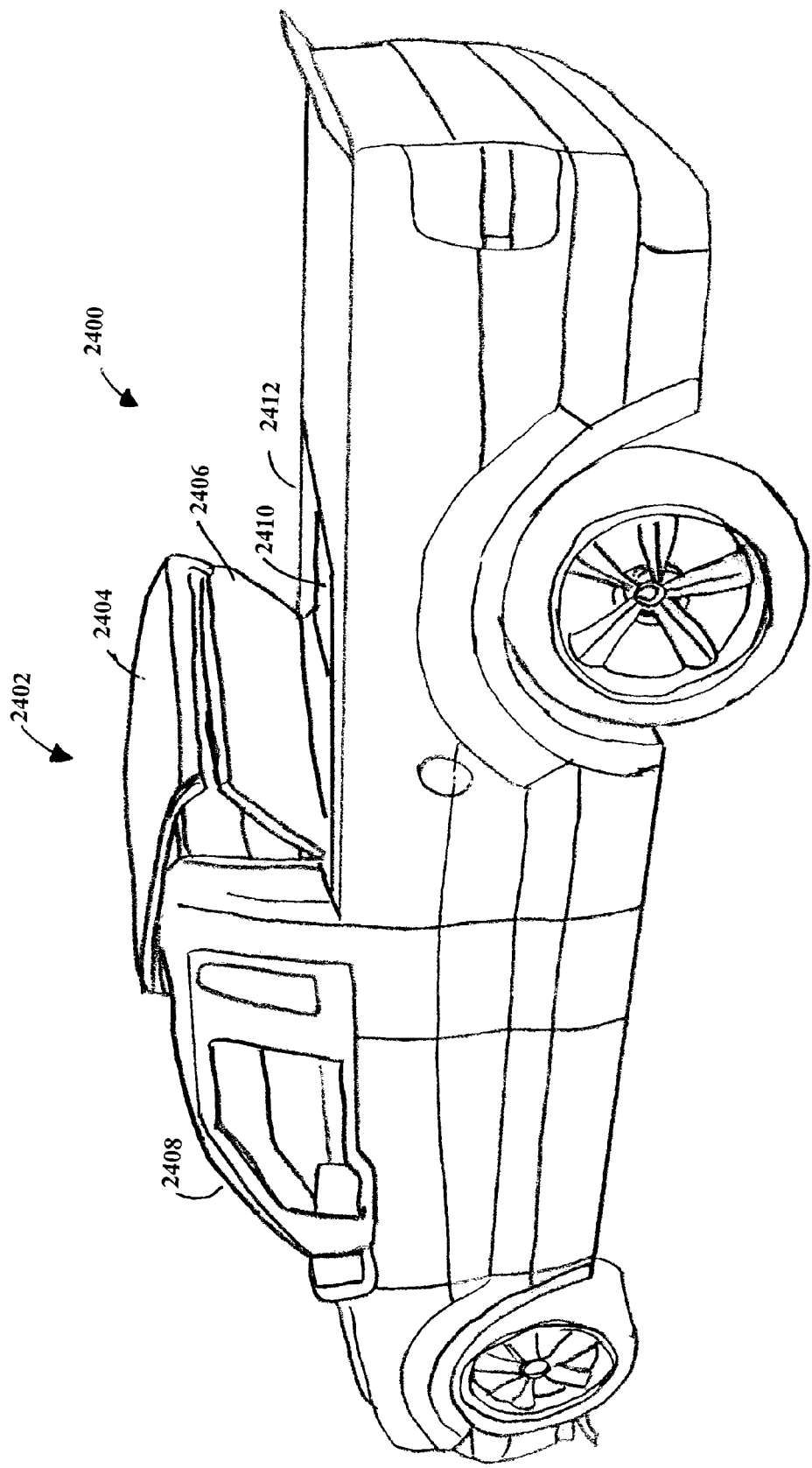
FIG. 24 is a perspective view of a pickup truck having a retractable rigid roof viewed in a partially open position.
Figure 25:
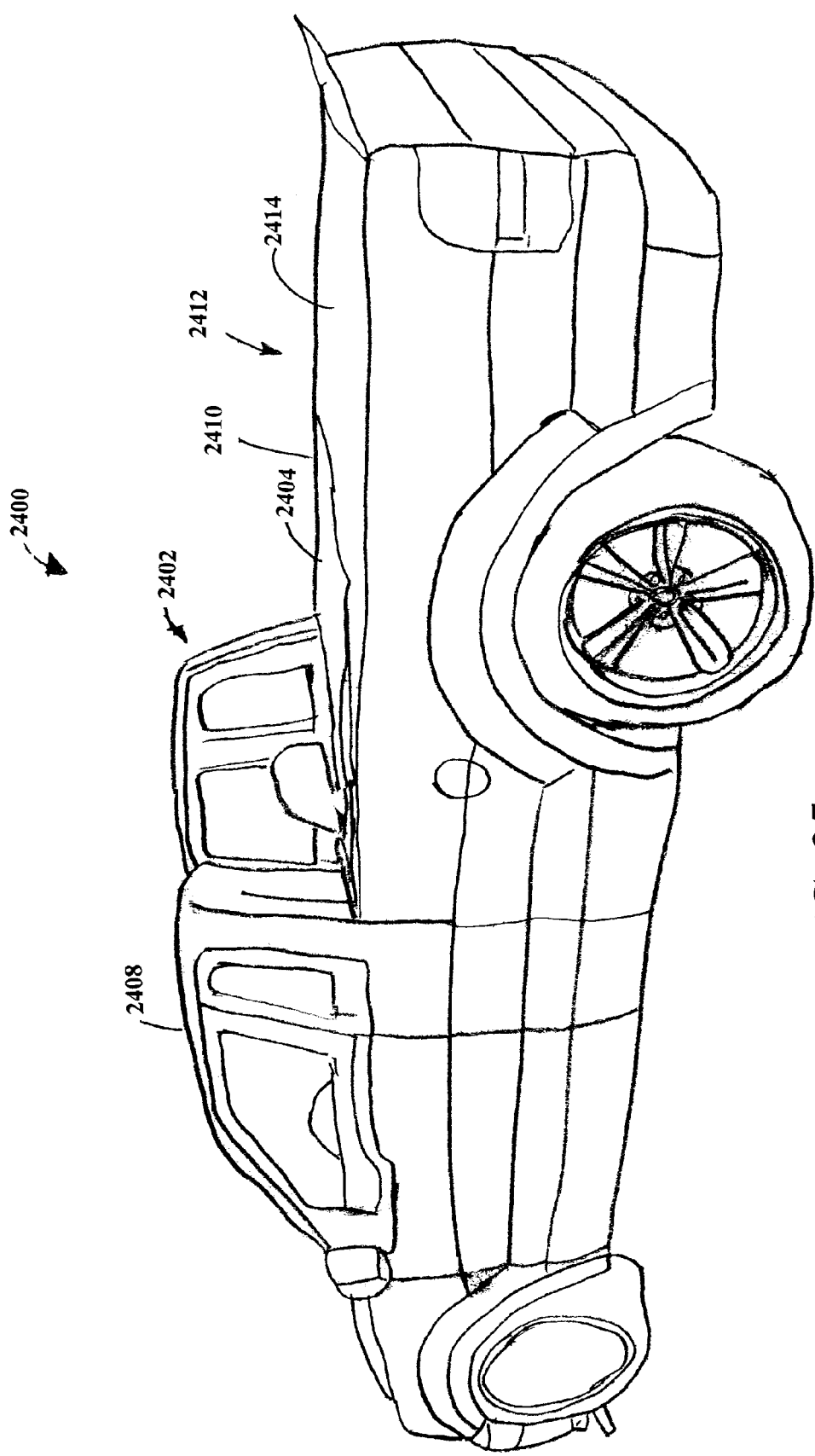
FIG. 25 is a perspective view of the pickup truck of FIG. 24 with the retractable rigid roof viewed in an open position.

Consistent with another embodiment, FIG. 24 is a perspective view of a pickup truck 2400 having a retractable rigid roof 2402 viewed in a partially open position. The retractable rigid roof 2402 includes an upper roof portion 2404 and a rear window portion 2406 connected to one another by one or more hinges. In the closed position (not shown in FIG. 24), the upper roof portion 2404 is connected to a windshield portion 2408 of the pickup truck 2400. As shown in FIG. 24, the retractable rigid roof 2402 can be actuated to retract from the closed position to an open position. FIG. 25 is a perspective view of the pickup truck 2400 of FIG. 24 with the retractable rigid roof 2402 viewed in the open position. When the retractable rigid roof 2402 is in the open position, the rear window portion 2406 fits into a recessed storage area 2410 located in a rearward compartment 2412 of the pickup truck 2400. As shown in FIG. 25, when the retractable rigid roof 2402 is in the open position, the upper roof portion 2404 is substantially flush with a tonneau cover 2414 covering at least a portion of the rearward compartment 2412. The rear window portion 2406 is located beneath the upper roof portion 2404 and is not visible in FIG. 25.

Figure 26:
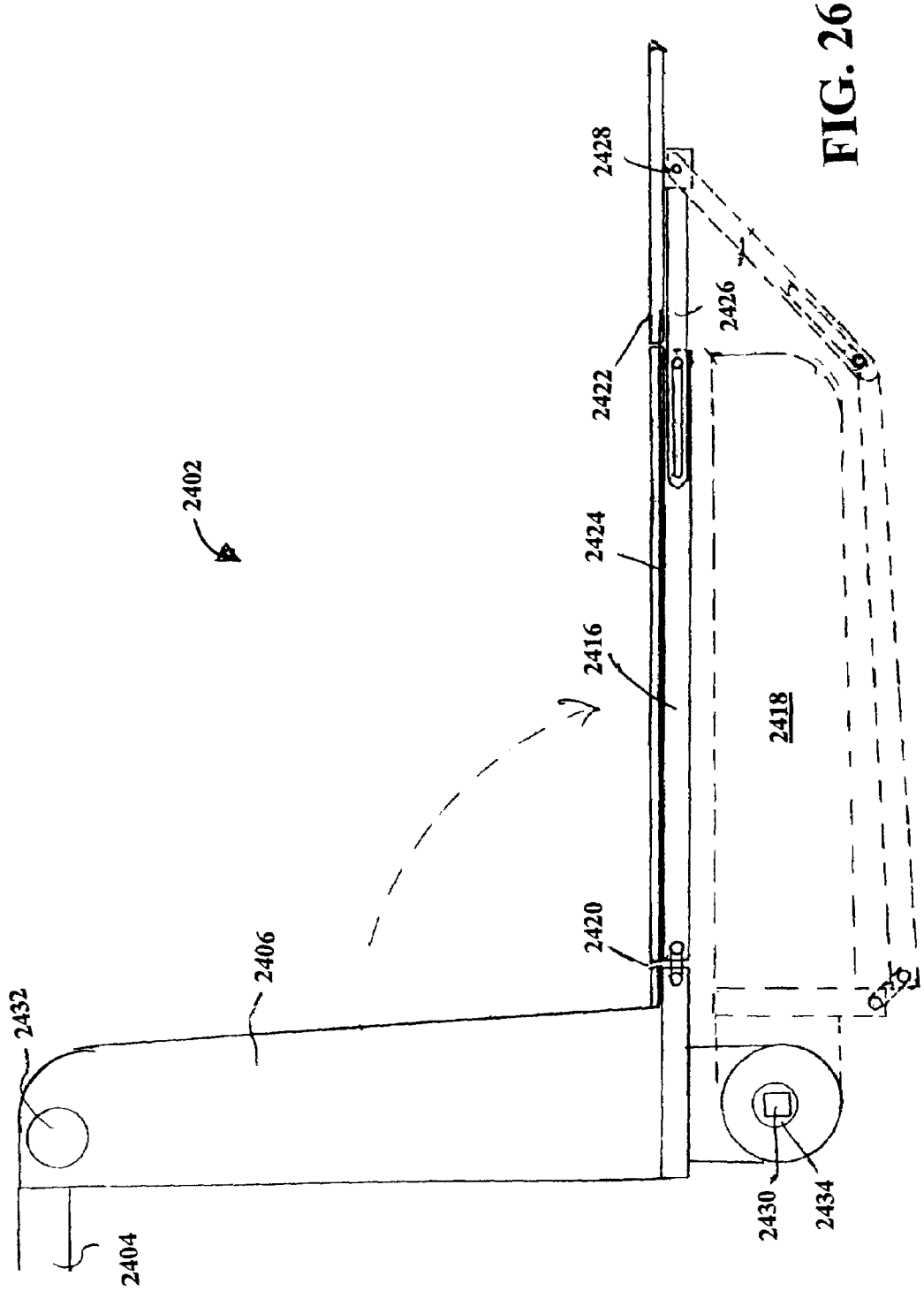
FIG. 26 is a side view of a convertible vehicle hardtop retracting arrangement according to another embodiment.
Figure 27:
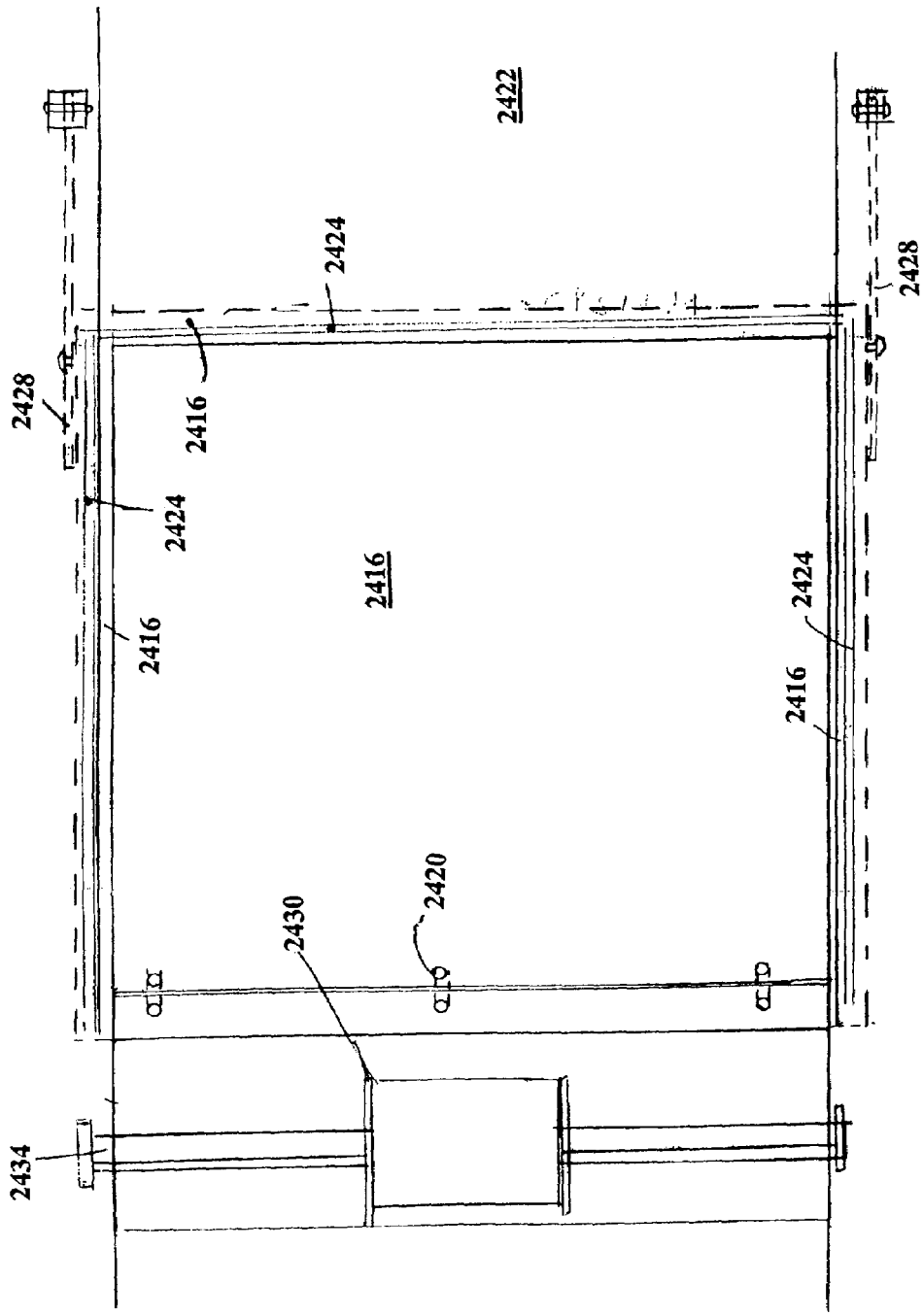
FIG. 27 is a plan view of the convertible vehicle hardtop retracting arrangement of FIG. 26.

The retractable rigid roof 2402 of FIGS. 24 and 25 can be implemented using any of a number of techniques. As one particular example, FIG. 26 illustrates a side view of the retractable rigid roof 2402. FIG. 27 illustrates a plan view of the retractable rigid roof 2402. The retractable rigid roof 2402 includes the upper roof portion 2404 and the rear window portion 2406, which may be connected to one another using, for example, a piano hinge or other type of hinge. The rear window portion 2406 is connected to a storage lid 2416 that is located above a storage area 2418 of the pickup truck. The rear window portion 2406 may be connected to the storage lid 2416, for example, using an invisible Soss-type hinge 2420 or another suitable type of hinge, such as a butt hinge. The storage lid 2416, in turn, abuts a tonneau cover 2422 that covers the rearward portion of the storage area 2418. In some embodiments, a gasket 2424 may be applied to the storage lid 2416 so that the gasket 2424 covering the storage lid 2416 is at least substantially level with the tonneau cover 2422, so as to promote an aesthetically appealing appearance of the pickup truck 2400.

A glide control 2426 is operatively connected to the storage lid 2416 to control the recessing action of the storage lid 2416. The glide control 2426 includes a spring 2428 that provides tension to assist the upward closing movement of the storage lid 2416. A channel (not shown) defined within the glide control 2426 receives a portion of the storage lid 2416 to direct the closing movement of the storage lid 2416 and to secure the storage lid 2416 tight against the tonneau cover 2422 when the retractable rigid roof 2402 is in the closed position. The glide control 2426 may be implemented as a pair of glide brackets located on either side of the storage lid 2416. Alternatively, the glide control 2426 may be implemented as a single L-shaped bracket traversing the entire width of the storage lid 2416 that avoids the need for the channel.

The movement of the retractable rigid roof 2402 between the open and closed positions is driven by a gear motor 2430 and a motor 2432. In operation, when the gear motor 2430 is actuated, it rotates about a fulcrum point 2434 to rotate the rear window portion 2406 of the rigid retractable roof 2402 toward the storage lid 2416. The upper roof portion 2404 separates from the windshield portion 2408 illustrated in FIGS. 24 and 25.

As the rear window portion 2406 continues to rotate toward the storage lid 2416, the motor 2432 actuates and causes the upper roof portion 2404 to rotate toward the rear window portion 2406. In some embodiments, the motor 2432 can be replaced by a spring that is biased to resist movement of the upper roof portion 2404 toward the rear window portion 2408 when the retractable rigid roof 2402 is in the closed position. Thus, when the retractable rigid roof 2402 is in the closed position, the spring holds the upper roof portion 2404 at a predetermined angle relative to the rear window portion 2408. As the retractable rigid roof 2402 moves toward the open position, the tension of the spring is overcome, allowing the upper roof portion 2404 to rotate toward the rear window portion 2408. When the retractable rigid roof 2402 is moved toward the closed position, the spring tension urges the upper roof portion 2404 toward the predetermined angle relative to the rear window portion 2408.

In addition, the storage lid 2416 recesses into the storage area 2418 so that the rear window portion 2406 can be concealed within the storage area 2418 while substantially maintaining the profile of the pickup truck 2400. When the retractable rigid roof 2402 is in the fully open position, the rear window portion 2406 is located completely within the storage area 2418, as indicated by the dashed lines in FIG. 26, and the upper roof portion 2404 is folded over the rear window portion 2406. In the open position, the upper roof portion 2404 is substantially level with the tonneau cover 2422.

Figure 28:
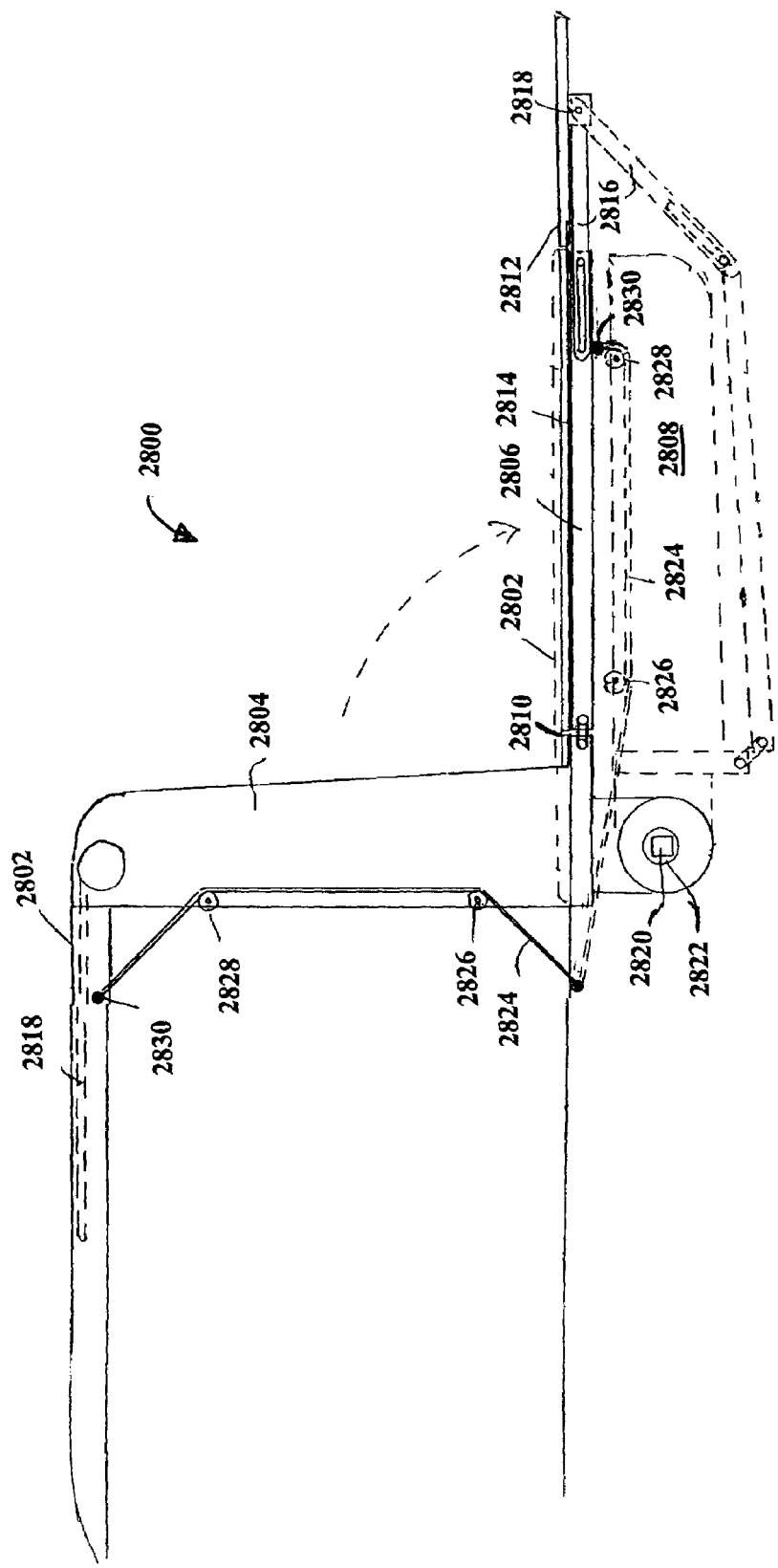
FIG. 28 is a side view of another convertible vehicle hardtop retracting arrangement according to still another embodiment.

FIG. 28 is a side view of another retractable rigid roof 2800 according to still another embodiment. The retractable rigid roof 2800 includes an upper roof portion 2802 and a rear window portion 2804, which may be connected to one another with a hinge, such as a piano hinge. The rear window portion 2804 is connected to a storage lid 2806 that is located above a storage area 2808 of the pickup truck. The rear window portion 2804 may be connected to the storage lid 2806, for example, using an invisible Soss-type hinge 2810 or another suitable type of hinge, such as a butt hinge. The storage lid 2806, in turn, abuts a tonneau cover 2812 that covers the rearward portion of the storage area 2808. In some embodiments, a gasket 2814 may be applied to the storage lid 2806 so that the gasket 2814 covering the storage lid 2806 is at least substantially level with the tonneau cover 2812, so as to promote an aesthetically appealing appearance of the pickup truck 2400.

A glide control 2816 is operatively connected to the storage lid 2806 to control the recessing action of the storage lid 2806. The glide control 2816 includes a spring 2818 that provides tension to assist the upward closing movement of the storage lid 2806. The spring 2818 is biased to resist movement of the upper roof portion 2802 toward the rear window portion 2804 when the retractable rigid roof 2800 is in the closed position. Thus, when the retractable rigid roof 2800 is in the closed position, the spring 2818 holds the upper roof portion 2802 at a predetermined angle relative to the rear window portion 2804. As the retractable rigid roof 2800 moves toward the open position, the tension of the spring 2818 is overcome, allowing the upper roof portion 2802 to rotate toward the rear window portion 2804. When the retractable rigid roof 2800 is moved toward the closed position, the spring tension urges the upper roof portion 2802 toward the predetermined angle relative to the rear window portion 2804.

A channel (not shown) defined within the glide control 2816 receives a portion of the storage lid 2806 to direct the closing movement of the storage lid 2806 and to secure the storage lid 2806 tight against the tonneau cover 2812 when the retractable rigid roof 2800 is in the closed position. The glide control 2816 may be implemented as a pair of glide brackets located on either side of the storage lid 2806. Alternatively, the glide control 2816 may be implemented as a single L-shaped bracket traversing the entire width of the storage lid 2806 that avoids the need for the channel.

The movement of the retractable rigid roof 2800 between the open and closed positions is driven by a gear motor 2820. In operation, when the gear motor 2820 is actuated, it rotates about a fulcrum point 2822 to rotate the rear window portion 2804 of the rigid retractable roof 2800 toward the storage lid 2806. The upper roof portion 2802 separates from the windshield portion 2408 illustrated in FIGS. 24 and 25.

A cable 2824 is connected to the upper roof portion 2802 and is channeled through the interior of the pickup truck via pulleys 2826 and 2828. As the rear window portion 2804 continues to rotate toward the storage lid 2806, the cable 2824 provides sufficient tension to overcome the tension of the spring 2818, which maintains the upper roof portion 2802 and the rear window portion 2804 in a predetermined angular relationship when the retractable rigid roof 2800 is in the closed position. By overcoming the tension of the spring 2818, the cable 2824 causes the upper roof portion 2802 to rotate toward the rear window portion 2804. When the retractable rigid roof 2800 is completely retracted into the open position, the end 2830 of the cable 2824 that is connected to the upper roof portion 2802 is pulled snug against the rear window portion 2804.

In addition, the storage lid 2806 recesses into the storage area 2808 so that the rear window portion 2804 can be concealed within the storage area 2808 while substantially maintaining the profile of the pickup truck 2400. When the retractable rigid roof 2800 is in the fully open position, the rear window portion 2804 is located completely within the storage area 2808, as indicated by the dashed lines in FIG. 28, and the upper roof portion 2802 is folded over the rear window portion 2804. In the open position, the upper roof portion 2802 is substantially level with the tonneau cover 2812.

Figure 29:
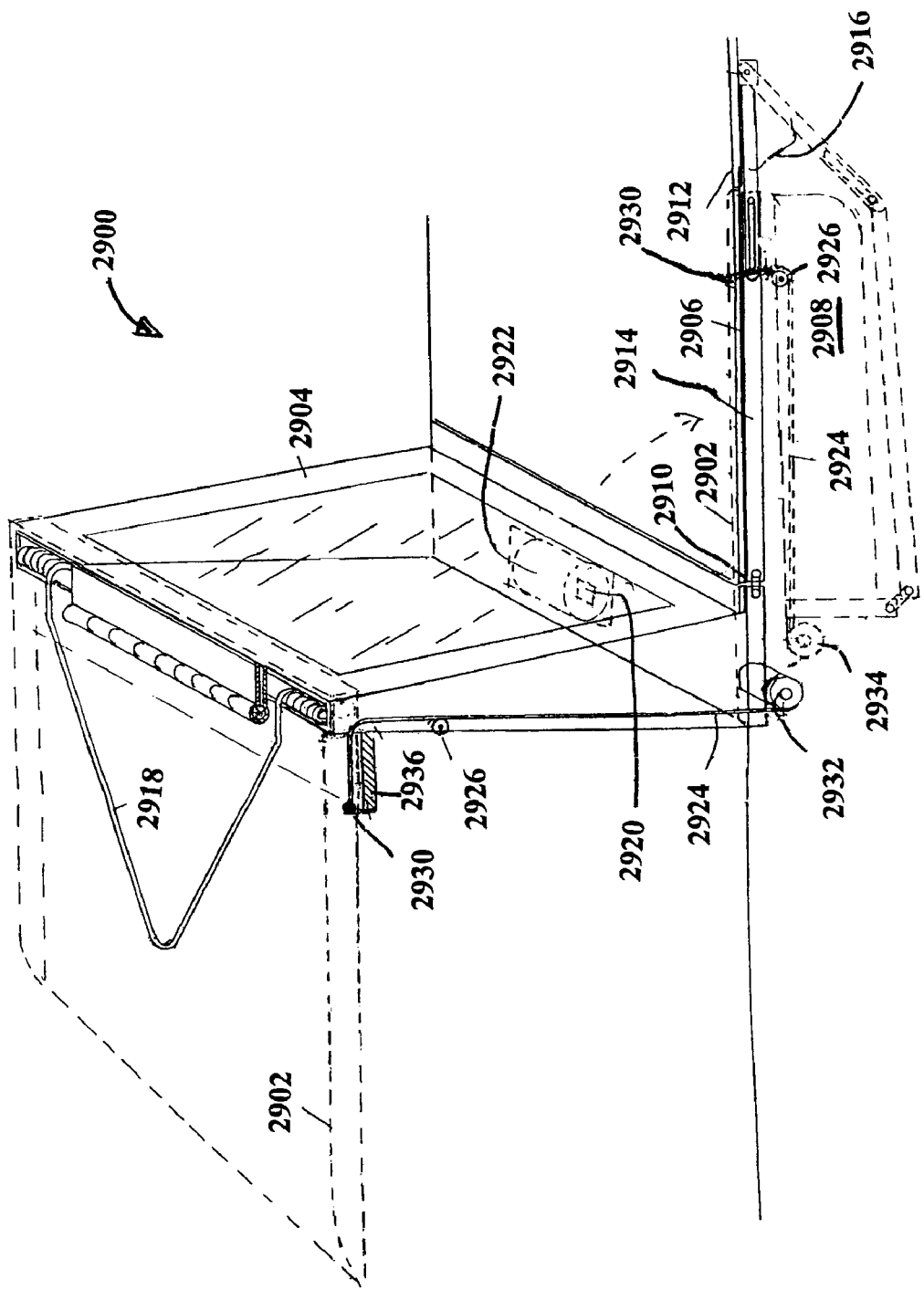
FIG. 29 is a side view of still another convertible vehicle hardtop retracting arrangement according to yet another embodiment.

FIG. 29 is a side view of still another retractable rigid roof 2900 according to yet another embodiment. The retractable rigid roof 2900 includes an upper roof portion 2902 and a rear window portion 2904, which may be connected to one another using a hinge, such as a piano hinge. The rear window portion 2904 is connected to a storage lid 2906 that is located above a storage area 2908 of the pickup truck. The rear window portion 2904 may be connected to the storage lid 2906, for example, using an invisible Soss-type hinge 2910 or another suitable type of hinge, such as a butt hinge. The storage lid 2906, in turn, abuts a tonneau cover 2912 that covers the rearward portion of the storage area 2908. In some embodiments, a gasket 2914 may be applied to the storage lid 2906 so that the gasket 2914 covering the storage lid 2906 is at least substantially level with the tonneau cover 2912, so as to promote an aesthetically appealing appearance of the pickup truck 2400.

A glide control 2916 is operatively connected to the storage lid 2906 to control the recessing action of the storage lid 2906. The glide control 2916 includes a spring 2918 that provides tension to assist the upward closing movement of the storage lid 2906. The spring 2918 is biased to resist movement of the upper roof portion 2902 toward the rear window portion 2904 when the retractable rigid roof 2900 is in the closed position. Thus, when the retractable rigid roof 2900 is in the closed position, the spring 2918 holds the upper roof portion 2902 at a predetermined angle relative to the rear window portion 2904. As the retractable rigid roof 2900 moves toward the open position, the tension of the spring 2918 is overcome, allowing the upper roof portion 2902 to rotate toward the rear window portion 2904. When the retractable rigid roof 2900 is moved toward the closed position, the spring tension urges the upper roof portion 2902 toward the predetermined angle relative to the rear window portion 2904.

A channel (not shown) defined within the glide control 2916 receives a portion of the storage lid 2906 to direct the closing movement of the storage lid 2906 and to secure the storage lid 2906 tight against the tonneau cover 2912 when the retractable rigid roof 2900 is in the closed position. The glide control 2916 may be implemented as a pair of glide brackets located on either side of the storage lid 2906. Alternatively, the glide control 2916 may be implemented as a single L-shaped bracket traversing the entire width of the storage lid 2906 that avoids the need for the channel.

The movement of the retractable rigid roof 2900 between the open and closed positions is driven by a gear motor 2920, which may be energized in response to actuation of a microswitch. In operation, when the gear motor 2920 is energized, it rotates about a fulcrum point 2922 to rotate the rear window portion 2904 of the rigid retractable roof 2900 toward the storage lid 2906. The upper roof portion 2902 separates from the windshield portion 2408 illustrated in FIGS. 24 and 25.

A cable 2924 is connected to the upper roof portion 2902 and is channeled through the interior of the pickup truck via a pulley 2926. As the rear window portion 2904 continues to rotate toward the storage lid 2906, the cable 2924 provides sufficient tension to overcome the tension of the spring 2918, which maintains the upper roof portion 2902 and the rear window portion 2904 in a predetermined angular relationship when the retractable rigid roof 2900 is in the closed position. By overcoming the tension of the spring 2918, the cable 2924 causes the upper roof portion 2902 to rotate toward the rear window portion 2904. When the retractable rigid roof 2900 is completely retracted into the open position, the end 2930 of the cable 2924 that is connected to the upper roof portion 2902 is pulled snug against the rear window portion 2904.

In the embodiment shown in FIG. 29, the other end 2932 of the cable 2924 is connected to a reversible gear motor pulley 2934. This arrangement provides a delayed separate schedule in which the upper roof portion 2902 does not begin rotating toward the rear window portion 2904 until the rear window portion 2904 is completely recessed into the storage area 2908. Delaying the rotation of the upper roof portion 2902 in this manner provides extra clearance for the upper roof portion 2902 when the retractable rigid roof 2900 is moved to the closed position. This extra clearance may be particularly advantageous, for example, if the vehicle is equipped with a roll bar 2936. In addition, the slack cable 2924 can rest above the roll bar 2936 until the gear motor 2920 is actuated to move the retractable rigid roof 2900 between the open and closed positions. In some embodiments, the upper roof portion 2902 may begin rotating toward the rear window portion 2904 at some point after the rear window portion 2904 begins to recess into the storage area 2908, but before the rear window portion 2904 is completely recessed into the storage area 2908.

In addition, the storage lid 2906 recesses into the storage area 2908 so that the rear window portion 2904 can be concealed within the storage area 2908 while substantially maintaining the profile of the pickup truck 2400. While the appearance of certain perimeter recesses or contours of the roof may be different from the surrounding area of the lid 2906, the upper roof portion 2902 and the lid 2906 are at least substantially coplanar when the retractable rigid roof 2900 is in the fully open position. When the retractable rigid roof 2900 is in the fully open position, the rear window portion 2904 is located completely within the storage area 2908, as indicated by the dashed lines in FIG. 29, and the upper roof portion 2902 is folded over the rear window portion 2904. In the open position, the upper roof portion 2902 is substantially level with the tonneau cover 2912.

Figure 30:
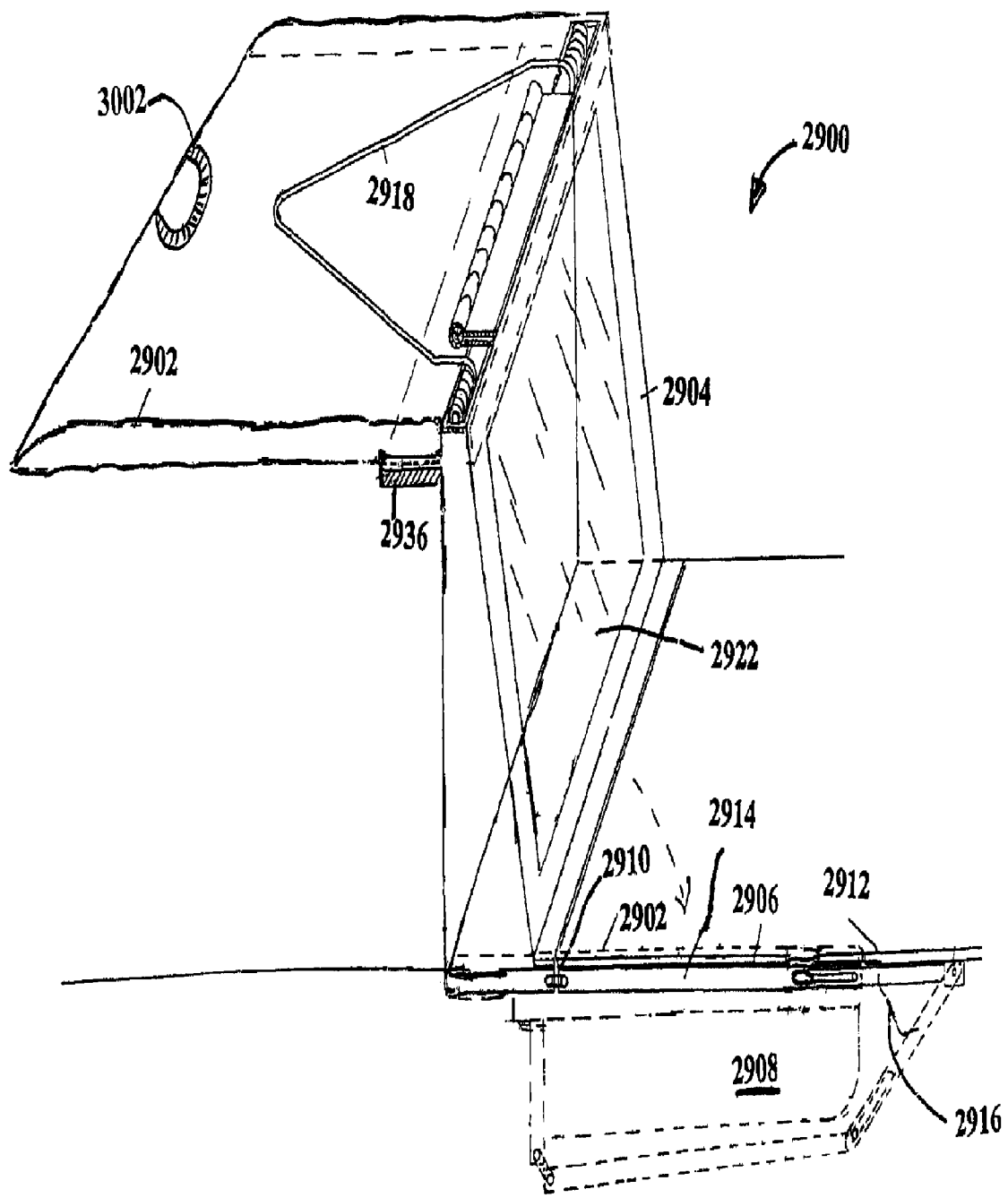
FIG. 30 is a side view of yet another convertible vehicle hardtop retracting arrangement according to yet another embodiment.

The gear motor 2920 may be omitted in some embodiments in which the retractable rigid roof 2900 is operated manually. In addition, the cable 2924 may or may not be omitted as well. In such embodiments, the gear motor 2920 is replaced with a handle (shown at reference numeral 3002 on FIG. 30) located on the interior of the roof. A driver or passenger can pull the handle to open or close the retractable rigid roof 2900. As described above, the spring 2918 is biased to resist movement of the upper roof portion 2902 toward the rear window portion 2904 when the retractable rigid roof 2900 is in the closed position. Thus, when the retractable rigid roof 2900 is in the closed position, the spring 2918 holds the upper roof portion 2902 at a predetermined angle relative to the rear window portion 2904. As the retractable rigid roof 2900 moves toward the open position, the tension of the spring 2918 is overcome, allowing the upper roof portion 2902 to rotate toward the rear window portion 2904. When the retractable rigid roof 2900 is moved toward the closed position, the spring tension urges the upper roof portion 2902 toward the predetermined angle relative to the rear window portion 2904.

In addition, while not required, a second spring or spring-loaded pneumatic device (not shown) may be provided to resist downward movement of the rear window portion 2904 as the retractable rigid roof 2900 moves toward the open position. As a result, the driver or passenger can open the retractable rigid roof 2900 by applying sufficient manual force to overcome the bias of this second spring or spring-loaded pneumatic device, and the downward movement of the rear window portion 2904 is slowed sufficiently to prevent the rear window portion from crashing. When the driver or passenger closes the retractable rigid roof 2900, the second spring or spring-loaded pneumatic device assists the manual efforts of the driver or passenger.

It is to be understood that even though numerous characteristics and advantages of various embodiments have been set forth in the foregoing description, together with details of the structure and function of various embodiments, this disclosure is illustrative only, and changes may be made in detail, especially in matters of structure and arrangement of parts within the principles of this disclosure to the full extent indicated by the broad general meaning of the terms in which the appended claims are expressed. For example, the particular components such as drive motors and drive mechanisms may vary by manufacturer, having differing design tolerances, mounting requirements and packaging. The spring 790 may be of a different size or orientation, the spring 790 may be used to assist a drive motor or even eliminated altogether, if manual or motor control is preferred. Additionally, the common components such as fasteners and springs may have a wide range of operating range and tolerances which will affect the results in varying degrees. The particular components may be selected depending on the particular application for the roof system while maintaining substantially the same functionality without departing from the scope and spirit of the present disclosure. For example, it can be appreciated by those familiar with the art, that motors 125, 250, 551, 553, 650, and 675 are not required but instead may be substituted with hydraulic systems or moved by manual operation. In addition, although the preferred embodiment described herein is directed to a retracting roof for a vehicle resembling an automobile, it will be appreciated by those skilled in the art that the teachings of the present disclosure can be applied to other systems, like commercial, agricultural or utility vehicles without departing from the scope and spirit of the present disclosure.

What is claimed is:

1. A roof retracting apparatus for a vehicle having a rearward storage space, the roof retracting apparatus comprising:
    a roof portion movable between a closed position and an open position, the roof portion located above a body of the vehicle and proximate the rearward storage space when in the closed position;
    a lid located above the rearward storage space when the roof portion is in the closed position, the lid being configured to descend into the storage space as the roof portion moves to the open position above the lid while substantially preserving a side profile of the vehicle and permitting storage space access, wherein the roof portion is located above the lid when the roof portion is in the open position; and
    a glide control arrangement operatively connected to the lid and configured to direct motion of the lid when the roof portion moves between the open and closed positions, the glide control arrangement comprising a spring configured and arranged to provide tension to assist the motion of the lid when the roof portion moves to the closed position.

2. The roof retracting apparatus of claim 1, wherein the glide control arrangement defines a channel to receive a portion of the lid when the roof portion moves to the closed position to direct the motion of the lid when the roof portion moves to the closed position.

3. The roof retracting apparatus of claim 1, further comprising a reversible drive mechanism operatively connected to the roof portion and extending toward the lid, the drive mechanism being configured to apply force for moving the roof portion between the closed and open positions.

4. The roof retracting apparatus of claim 1, further comprising a rear window portion connected to the roof portion and to the lid.

5. The roof retracting apparatus of claim 4, wherein the rear window portion is connected to the lid using at least one Soss-type hinge.

6. The roof retracting apparatus of claim 4, further comprising a gear motor operatively connected to the window portion and configured and arranged to rotate the rear window portion toward the lid when the gear motor is energized.

7. The roof retracting apparatus of claim 6, further comprising a reversible gear motor pulley operatively connected to the gear motor via the window portion, the roof portion, and a cable connected to the roof portion and to the reversible gear motor pulley.

8. The roof retracting apparatus of claim 7,
wherein energizing the gear motor causes the reversible gear motor pulley to rotate and to pull the cable to cause the roof portion to rotate toward the rear window portion as the roof portion moves to the open position.

9. The roof retracting apparatus of claim 1, wherein the vehicle is a pickup truck.

10. The roof retracting apparatus of claim 9, further comprising a tonneau cover arranged to cover at least part of the rearward storage space.

11. A method of retracting a rigid roof of a vehicle from a closed position to an open position for external storage over a rearward storage space while preserving a side profile of the vehicle and permitting access to the rearward storage space, the method utilizing a roof portion located above a body of the vehicle when the roof portion is in the closed position, a lid located above the rearward storage space when the roof portion is in the closed position, a rear window portion connected to the roof portion and to the lid, and a glide control arrangement operatively connected to the lid and configured to direct motion of the lid when the roof portion moves between the open and closed positions, the method comprising:
rotating the rear window portion toward the lid about a fulcrum between the rear window portion and the lid;
rotating the roof portion toward the rear window portion; and
while the rear window portion is rotated toward the lid, causing the lid to recess into the rearward storage space using the glide control arrangement.

12. The method of claim 11, wherein rotating the roof portion toward the rear window portion comprises energizing a motor located between the roof portion and the rear window portion.

13. The method of claim 11, wherein rotating the rear window portion toward the lid comprises energizing a gear motor located between the rear window portion and the lid.

14. The method of claim 13, wherein spring tension maintains the roof portion and the rear window portion in a predetermined angular relationship when the rigid roof is in the closed position, and energizing the gear motor causes the spring tension to be overcome to allow the roof portion to rotate toward the rear window portion.

15. The method of claim 13, further comprising:
providing a reversible gear motor pulley operatively connected to the gear motor via the rear window portion, the roof portion, and a cable connected to the roof portion and to the reversible gear motor pulley;
wherein energizing the gear motor causes the reversible gear motor pulley to rotate and to pull the cable, thereby rotating the roof portion toward the rear window portion.

16. The method of claim 15, wherein the cable is connected to the roof portion so as to be slack when the retractable rigid roof is in the closed position.

17. The method of claim 11, wherein rotating the roof portion toward the lid comprises manually pulling a handle that is operatively connected to the roof portion.

* * * * *